(12) United States Patent
Okaue

(10) Patent No.: US 7,362,870 B2
(45) Date of Patent: Apr. 22, 2008

(54) METHOD AND APPARATUS FOR RECORDING/PLAYING BACK INFORMATION

(75) Inventor: Takumi Okaue, Tokyo (JP)

(73) Assignee: Sony Corporation (JP)

( * ) Notice: Subject to any disclaimer, the term of this patent is extended or adjusted under 35 U.S.C. 154(b) by 698 days.

(21) Appl. No.: 10/311,488

(22) PCT Filed: Apr. 17, 2002

(86) PCT No.: PCT/JP02/03804

§ 371 (c)(1),
(2), (4) Date: May 8, 2003

(87) PCT Pub. No.: WO02/087147

PCT Pub. Date: Oct. 31, 2002

(65) Prior Publication Data

US 2004/0019795 A1  Jan. 29, 2004

(30) Foreign Application Priority Data

Apr. 19, 2001 (JP) .............................. 2001-120494

(51) Int. Cl.
*H04L 9/00* (2006.01)
(52) U.S. Cl. .................. 380/281; 713/157; 713/177; 380/277
(58) Field of Classification Search ............. 380/281, 380/277; 713/157, 177
See application file for complete search history.

(56) References Cited

U.S. PATENT DOCUMENTS

| | | | | |
|---|---|---|---|---|
| 4,227,253 A | * | 10/1980 | Ehrsam et al. ............. | 380/45 |
| 4,611,272 A | * | 9/1986 | Lomet ......................... | 707/3 |
| 4,933,969 A | * | 6/1990 | Marshall et al. ........... | 713/177 |
| 4,969,188 A | * | 11/1990 | Schobi ........................ | 380/277 |
| 5,200,999 A | * | 4/1993 | Matyas et al. ............. | 380/277 |

(Continued)

FOREIGN PATENT DOCUMENTS

DE  195 11 298 A1  10/1996

(Continued)

OTHER PUBLICATIONS

Nakano, et al., "Key Management System for Digital Content Protection", 2001 Symposium on Cryptography and Information Security, Oiso, Japan, pp. 213-218, Jan. 23, 2001.

(Continued)

*Primary Examiner*—Emmanuel L. Moise
*Assistant Examiner*—Techane J. Gergiso
(74) *Attorney, Agent, or Firm*—Lerner, David, Littenberg, Krumholz & Mentlik, LLP

(57) ABSTRACT

A data processing apparatus extracts a root key by decrypting an enabling key block. The data processing apparatus then produces a content key on the basis of a random number and encrypts the content key using the root key. Furthermore, the data processing apparatus encrypts an ID of the data processing apparatus using the produced content key thereby producing a storage key. The data processing apparatus then produces encrypted content by encrypting a content using the storage key. Furthermore, the data processing apparatus stores the encrypted content together with the data produced by encrypting the content by the root key into a removable storage medium.

The content, stored into the removable storage medium in the above-described manner, can be played back only by a specific limited device.

30 Claims, 22 Drawing Sheets

U.S. PATENT DOCUMENTS

| | | | |
|---|---|---|---|
| 5,396,614 A * | 3/1995 | Khalidi et al. | 711/118 |
| 5,432,852 A * | 7/1995 | Leighton et al. | 380/30 |
| 5,584,022 A * | 12/1996 | Kikuchi et al. | 707/9 |
| 5,606,617 A * | 2/1997 | Brands | 380/30 |
| 5,721,781 A | 2/1998 | Deo et al. | |
| 5,748,736 A | 5/1998 | Mittra | |
| 6,044,155 A * | 3/2000 | Thomlinson et al. | 713/155 |
| 6,049,878 A * | 4/2000 | Caronni et al. | 726/3 |
| 6,088,454 A * | 7/2000 | Nagashima et al. | 380/286 |
| 6,128,263 A * | 10/2000 | Fujii et al. | 369/47.27 |
| 6,240,188 B1 * | 5/2001 | Dondeti et al. | 380/284 |
| 6,289,102 B1 * | 9/2001 | Ueda et al. | 380/201 |
| 6,367,019 B1 * | 4/2002 | Ansell et al. | 726/26 |
| 6,522,607 B1 * | 2/2003 | Ishibashi et al. | 369/47.1 |
| 6,574,609 B1 * | 6/2003 | Downs et al. | 705/50 |
| 6,609,116 B1 * | 8/2003 | Lotspiech | 705/57 |
| 6,636,968 B1 * | 10/2003 | Rosner et al. | 713/178 |
| 6,850,914 B1 * | 2/2005 | Harada et al. | 705/57 |
| 6,862,354 B1 * | 3/2005 | McGrew et al. | 380/42 |
| 6,886,098 B1 * | 4/2005 | Benaloh | 713/193 |
| 7,013,389 B1 * | 3/2006 | Srivastava et al. | 713/163 |
| 7,043,024 B1 * | 5/2006 | Dinsmore et al. | 380/278 |
| 7,065,648 B1 * | 6/2006 | Kamibayashi et al. | 713/171 |
| 7,225,339 B2 * | 5/2007 | Asano et al. | 713/193 |
| 2001/0021255 A1 * | 9/2001 | Ishibashi | 380/277 |
| 2002/0133701 A1 * | 9/2002 | Lotspiech et al. | 713/163 |

FOREIGN PATENT DOCUMENTS

| | | | |
|---|---|---|---|
| EP | 0 107 448 A2 | | 5/1984 |
| EP | 1051036 A2 * | | 11/2000 |
| JP | 07-230412 A2 | | 8/1995 |
| JP | 11-102572 A1 | | 4/1999 |
| JP | 11-187013 A | | 7/1999 |
| JP | 11-195269 A1 | | 7/1999 |
| JP | 11-250568 A1 | | 9/1999 |
| JP | 0 994 475 A1 | | 4/2000 |
| JP | 2000-113587 A | | 4/2000 |
| JP | 2000-298942 A1 | | 10/2000 |
| WO | WO-00/52690 A1 | | 9/2000 |
| WO | WO-01/03364 A1 | | 1/2001 |
| WO | WO-01/03365 A1 | | 1/2001 |

OTHER PUBLICATIONS

Wallner, D. et al., "Key Management for Multicast: Issues and Architectures", IETF Request for Comments, The Internet Society, Jun. 1999, pp. 1-23.

Wong, C. K. et al., "Secure Group Communications Using Key Graphs" Proceedings of ACM SIGCOMM'98, pp. 68 to 79, Sep. 02, 1998 (Feb. 09, 1998), 3.4 Leaving a tree key graph (http://www.acm.org/sigcomm;sigcomm98/tp/technical.html).

Waldvogel, M. et al., "The VersaKey Framework: Versatile Group Key Management", IEEE Journal on Selected Areas in Communications, vol. 17, No. 9, pp. 1614 to 1631, Sep. 1999. Sep. 1999 (Sep. 1999), pp. 1616, right column to p. 1621, left column.

JP-11-187013-A Machine-Assisted Translation, Feb. 3, 2006, Thompson, pp. 1-30.

* cited by examiner

FIG. 4

(A) EKB (ENABLING KEY BLOCK): EXAMPLE 1

NODE KEY OF VERSION t IS TRANSMITTED TO DEVICES 0, 1, AND 2

| VERSION: t | |
|---|---|
| INDEX | ENCRYPTION KEY |
| 0 | Enc(K(t)0, K(t)root) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

(B) EKB (ENABLING KEY BLOCK): EXAMPLE 2

NODE KEY OF VERSION t IS TRANSMITTED TO DEVICES 0, 1, AND 2

| VERSION: t | |
|---|---|
| INDEX | ENCRYPTION KEY |
| 000 | Enc(K000, K(t)00) |
| 001 | Enc(K(t)001, K(t)00) |
| 0010 | Enc(K0010, K(t)001) |

STORAGE MEDIUM

FIG. 12
(a)
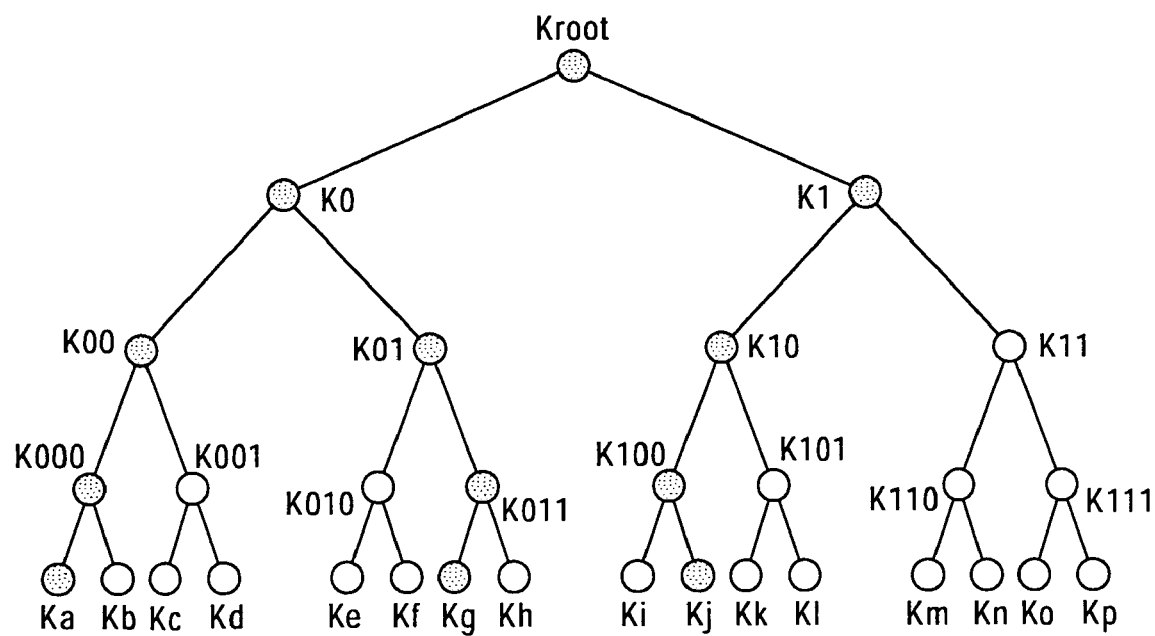
(b)
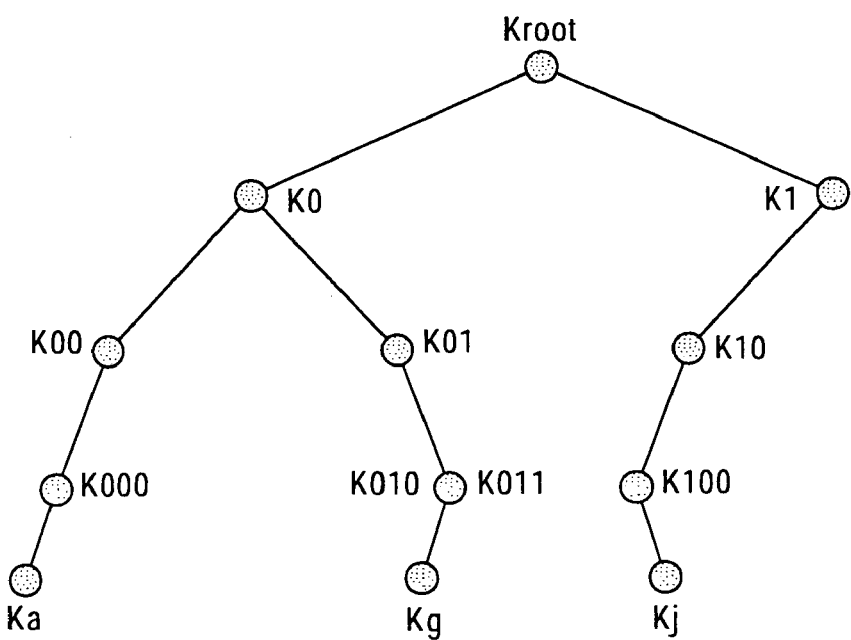

TRANSMISSION OF CONTENT KEY OF VERTION t TO DEVICES Ka, Kg, AND Kj USING EKB (ENABLING KEY BLOCK)

TRANSMISSION OF CONTENT KEY OF VERTION t TO DEVICES Ka, Kg, AND Kj USING SIMPLIFIED EKB (ENABLING KEY BLOCK)

METHOD AND APPARATUS FOR RECORDING/PLAYING BACK INFORMATION

CROSS-REFERENCE TO RELATED APPLICATIONS

The present application is a national stage application under 35 U.S.C. § 371 of International Application No. PCT/JP02/03804, filed Apr. 17, 2002, which claims priority from Japanese Application No. P2001-120494, filed Apr. 19, 2001, the disclosures of which are hereby incorporated by reference herein.

BACKGROUND OF THE INVENTION

1. Technical Field

The present invention relates to an information recording apparatus, an information playback apparatus, an information recording method, an information playback method, and a program. More particularly, the present invention relates to an information recording apparatus, an information playback apparatus, an information recording method, an information playback method, and a program, for allowing only authorized content utilization devices to play back various contents such as music, images, games or programs without allowing a content to be transferred or played back via a removable storage device in an unauthorized manner.

2. Background Art

It is now very popular to distribute various kinds of software data such as audio data, a game program and image data (hereinafter, such data will be referred to as a content) via a network such as the Internet or via a distributable storage medium such as a DVD or a CD. More specifically, a distributed content is purchased and played back in such a manner that the content is directly received by a PC (Personal Computer), a portable telephone, a data playback apparatus, or a game machine of a user and stored into an internal memory, or in such a manner that the content is stored into the internal memory via a storage medium such as a memory card, a CD, or a DVD.

An information device such as a portable telephone, a data playback apparatus, a game machine or a PC, used for the above purpose has a capability of receiving a distributed content via a network and/or has an interface for accessing a DVD or a CD, and further has control means necessary in playing back the content and a RAM, a ROM, or the like, used as a memory area for storing a program or data.

Various kinds of contents such as music data, video data, or a program may be read from a storage medium and played back on an information apparatus itself such as a portable telephone, a data playback apparatus device, a game machine or a PC used as a playback apparatus or played back on a display or by a speaker connected to the information apparatus, in response to a command input by a user directly to the information apparatus or indirectly via input means connected to the information apparatus.

In general, the right of distribution of software contents such as a game program, music data, or video data is held by producers or sellers of the software contents. Software contents are generally distributed under specific usage limitation to secure that only authorized users can use software contents and that unauthorized copies thereof cannot be made.

One technique of limiting usage to specific users is to encrypt a content. More specifically, a content such as audio data, video data, or a game program is distributed via the Internet or the like after encrypting the content, and a decryption key, which is means for decrypting the encrypted content, is given only to authorized users.

The encrypted data can be converted into its original form (plaintext) by performing a predetermined decryption process upon the encrypted data. The technique of encrypting and decrypting information using an encryption key and a decryption key is well known in the art.

Various techniques of encrypting and decrypting data using an encryption key and a decryption key are known. One of them is a technique known as common key cryptography. In the common key cryptography, the same key called a common key is used as both an encryption key for encrypting data and a decryption key for decrypting the encrypted data, and the common key is given only to authorized users so that unauthorized users who do not have the common key cannot access the data. A specific example of the common key cryptography is that based on the DES (Data Encryption Standard).

An encryption key for encrypting data and a decryption key for decrypting the encrypted data can be obtained from a password or the like using a unidirectional function such as a hash function. Herein, the unidirectional function refers to a function whose input is very difficult to guess from an output thereof. Although an encryption/decryption key can be generated using an output obtained by applying a unidirectional function to, for example, a password determined by a user, it is substantially impossible to determine, from the obtained encryption/decryption key, the password that is original data from which the encryption/decryption key is generated.

Another known technique is public key cryptography in which an encryption key used for encryption and a decryption key used for decryption are generated in accordance with different algorithms. In the public key cryptography, a public key, which is allowed to be used by any unspecified user, is issued by a particular user, and a document to be provided to that particular user is encrypted using the public key issued by the particular user. The document encrypted using the public key can only be decrypted using a secret key corresponding to the encryption key used to encrypt that document. The secret key is held only by the user who issued the public key, and thus the document encrypted using the public key can be decrypted only by the user having the secret key. A representative example of the public key cryptography is that based on the RSA (Rivest-Shamir-Adelman) algorithm. Using one of above-described cryptography techniques, it is possible to realize a system in which encrypted contents can be decrypted only by authorized users.

DISCLOSURE OF INVENTION

However, if content purchased by an authorized user is decrypted and directly stored into a removable storage device such as a memory card, the content can be played back by attaching the storage device including the content stored therein to a device of another user who has not purchased the content in an authorized manner. The content can be further copied into other storage devices and can be used by a great number of users. As described above, there is a possibility that a content purchased in an authorized manner is used by a large number of unauthorized users via unauthorized secondary distribution.

SUMMARY OF THE INVENTION

In view of the above problems in the conventional technique, it is desirable to provide a technique of allowing content stored in a removable storage medium, such as a memory card, to be used only by a device of a user who has purchased the content in an authorized manner, while preventing the content from being played back or used by other devices in an unauthorized manner.

It is also desirable to provide a technique of allowing content stored in a removable storage medium, such as a memory card, to be used only by a device of a user who has purchased the content in an authorized manner even in a case in which the content is purchased by attaching the removable storage medium of the user to, for example, a content distribution terminal operated by a service provider and storing the content into the removable storage medium.

According to a first aspect of the present invention, there is provided an information recording apparatus for recording information onto a recording medium, comprising: storage means storing a device node key (DNK) set including leaf keys and node keys uniquely assigned to leaves and nodes, respectively, of a hierarchical tree structure, said leaves being assigned to respective different information recording apparatuses; and cryptographic means for encrypting data to be stored into the storage medium, wherein the cryptographic means performs processing including:

producing an encryption key (Kst) to be applied to the data to be stored, by encrypting, using an encryption key (Kcon), a value uniquely assigned to a specific data playback apparatus which will play back the data stored in the storage medium, producing encrypted data Enc(Kst, DATA) by encrypting the data, to be stored, using the encryption key (Kst), producing encrypted key data by encrypting the encryption key (Kcon) used in the encryption of the uniquely assigned value, using one of keys, which are members of the heretical tree structure and which are stored in an enabling key block (EKB), said keys in the enabling key block (EKB) being encrypted in such a manner that each key at a level in the hierarchical tree structure is encrypted using at least a node key at a lower level or a leaf key; and storing a data file including the encrypted data and the encrypted key data together with the enabling key block (EKB) into the storage medium.

In an embodiment of the information recording apparatus according to the present invention, said specific data playback apparatus is said information recording apparatus itself, and said uniquely assigned value is a value uniquely assigned to said information recording apparatus.

In an embodiment of the information recording apparatus according to the present invention, said information recording apparatus is a content distribution terminal for distributing a content; said specific data playback apparatus is a data playback apparatus which uses a content downloaded from the content distribution terminal, and said uniquely assigned value is a value uniquely assigned to the data playback apparatus; and the information recording apparatus performs the encryption process by applying the encryption key (Kcon) to the value, input from the outside, uniquely assigned to the data playback apparatus.

In an embodiment of the information recording apparatus according to the present invention, the value uniquely assigned to the data playback apparatus is a unique telephone number of the data playback apparatus or unique identification data of the data playback apparatus.

In an embodiment of the information recording apparatus according to the present invention, the storage medium is a removable storage medium which can be removably attached to the information recording apparatus.

In an embodiment of the information recording apparatus according to the present invention, said one of keys, which are members of the hierarchical tree structure and which are stored in the enabling key block (EKB), is a root key Kroot assigned to the root, that is, the top node of the hierarchical tree structure.

In an embodiment of the information recording apparatus according to the present invention, said one of keys, which are members of the hierarchical tree structure and which are stored in the enabling key block (EKB), is a key which can be acquired by decrypting the enabling key block (EKB) using the device node key (DNK) set.

In an embodiment of the information recording apparatus according to the present invention, said one of keys, which are members of the hierarchical tree structure and which are stored in the enabling key block (EKB), is renewable; and the information recording apparatus acquires said renewed one of keys, which are members of the heretical tree structure and which are stored in an enabling key block (EKB), said keys in the enabling key block (EKB) being encrypted in such a manner that each key at a level in the hierarchical tree structure is encrypted using at least a node key at a lower level or a leaf key, by means of decrypting the enabling key block (EKB) using the device node key (DNK) set.

In an embodiment of the information recording apparatus according to the present invention, the cryptographic means produces the encryption key (Kcon) to be applied to the value uniquely assigned to the information recording apparatus, on the basis of a random number.

According to a second aspect of the present invention, there is provided an information playback apparatus for playing back data stored in a storage medium, comprising: storage means storing a device node key (DNK) set including leaf keys and node keys uniquely assigned to leaves and nodes, respectively, of a hierarchical tree structure, said leaves being assigned to respective different information playback apparatuses; and cryptographic means for decrypting the data stored in the storage medium, wherein the cryptographic means performs processing including:

acquiring, by means of decrypting an enabling key block (EKB) using the device node key (DNK) set, one of keys, which are members of the heretical tree structure and which are stored in the enabling key block (EKB) stored in the storage medium, said keys in the enabling key block (EKB) being encrypted in such a manner that each key at a level in the hierarchical tree structure is encrypted using at least a node key at a lower level or a leaf key;

acquiring an encryption key (Kcon) by decrypting encrypted key data using said one of keys, which are members of the hierarchical tree structure and which are stored in the storage medium; and producing a decryption key (Kst) to be applied to the data stored in the storage medium by encrypting a value uniquely assigned to the information playback apparatus and then decrypting encrypted data Enc(Kst, DATA) stored in the storage medium using the decryption key (Kst).

In an embodiment of the information playback apparatus according to the present invention, the value uniquely assigned to the information playback apparatus is a unique telephone number of the information playback apparatus or unique identification data of the information playback apparatus.

In an embodiment of the information playback apparatus according to the present invention, the storage medium is a removable storage medium which can be removably attached to the information playback apparatus.

In an embodiment of the information playback apparatus according to the present invention, said one of keys, which are members of the hierarchical tree structure and which are stored in the enabling key block (EKB), is a root key Kroot assigned to the root, that is, the top node of the hierarchical tree structure.

In an embodiment of the information playback apparatus according to the present invention, said one of keys, which are members of the hierarchical tree structure and which are stored in the enabling key block (EKB), is renewable; and the information playback apparatus acquires said renewed one of keys, which are members of the heretical tree structure and which are stored in an enabling key block (EKB), said keys in the enabling key block (EKB) being encrypted in such a manner that each key at a level in the hierarchical tree structure is encrypted using at least a node key at a lower level or a leaf key, by means of decrypting the enabling key block (EKB) using the device node key (DNK) set.

According to a third aspect of the present invention, there is provided an information recording method for an information recording apparatus to record information into a recording medium, said information recording apparatus including: storage means storing a device node key (DNK) set including leaf keys and node keys uniquely assigned to leaves and nodes, respectively, of a hierarchical tree structure, said leaves being assigned to respective different information recording apparatuses; and cryptographic means for encrypting data to be stored into the storage medium, the information recording method comprising the steps of:

producing an encryption key (Kst) to be applied to the data to be stored, by encrypting, using an encryption key (Kcon), a value uniquely assigned to a specific data playback apparatus which will play back the data stored in the storage medium;

producing encrypted data Enc(Kst, DATA), by encrypting the data to be stored using the encryption key (Kst);

producing encrypted key data by encrypting the encryption key (Kcon) used in the encryption of the uniquely assigned value, using one of keys, which are members of the hierarchical tree structure and which are stored in an enabling key block (EKB), said keys in the enabling key block (EKB) being encrypted in such a manner that each key at a level in the hierarchical tree structure is encrypted using at least a node key at a lower level or a leaf key; and storing a data file including the encrypted data and the encrypted key data together with the enabling key block (EKB) into the storage medium.

In an embodiment of the information recording method according to the present invention, said specific data playback apparatus is said information recording apparatus itself, and said uniquely assigned value is a value uniquely assigned to said information recording apparatus.

In an embodiment of the information recording method according to the present invention, said information recording apparatus is a content distribution terminal for distributing a content; said specific data playback apparatus is a data playback apparatus which uses a content downloaded from the content distribution terminal, and said uniquely assigned value is a value uniquely assigned to the data playback apparatus; and said step of producing the encryption key (Kst) includes the step of encrypting, using the encryption key (Kcon), the value uniquely assigned to the data playback apparatus, said value being input from the outside.

In an embodiment of the information recording method according to the present invention, the value uniquely assigned to the data playback apparatus is a unique telephone number of the data playback apparatus or unique identification data of the data playback apparatus.

In an embodiment of the information recording method according to the present invention, the storage medium is a removable storage medium which can be removably attached to the information recording apparatus.

In an embodiment of the information recording method according to the present invention, said one of keys, which are members of the hierarchical tree structure and which are stored in the enabling key block (EKB), is a root key Kroot assigned to the root, that is, the top node of the hierarchical tree structure.

In an embodiment of the information recording method according to the present invention, said one of keys, which are members of the hierarchical tree structure and which are stored in the enabling key block (EKB), is a key which can be acquired by decrypting the enabling key block (EKB) using the device node key (DNK) set.

In an embodiment of the information recording method according to the present invention, said one of keys, which are members of the hierarchical tree structure and which are stored in the enabling key block (EKB), is renewable; and the information recording method further comprises the step of, by means of decrypting the enabling key block (EKB) using the device node key (DNK) set, acquiring said renewed one of keys, which are members of the heretical tree structure and which are stored in an enabling key block (EKB), said keys in the enabling key block (EKB) being encrypted in such a manner that each key at a level in the hierarchical tree structure is encrypted using at least a node key at a lower level or a leaf key.

In an embodiment of the information recording method according to the present invention, the information recording method further comprises the step of, producing the encryption key (Kcon) to be applied to the value uniquely assigned to the information recording apparatus, on the basis of a random number.

According to a fourth aspect of the present invention, there is provided an information playback method for an information playback apparatus to play back data stored in a storage medium, said information playback apparatus including storage means storing a device node key (DNK) set including leaf keys and node keys uniquely assigned to leaves and nodes, respectively, of a hierarchical tree structure, said leaves being assigned to respective different information playback apparatuses; and cryptographic means for decrypting the data stored in the storage medium, the information playback method comprising the steps of:

by means of decrypting an enabling key block (EKB) using the device node key (DNK) set, acquiring one of keys, which are members of the heretical tree structure and which are stored in the enabling key block (EKB) stored in the storage medium, said keys in the enabling key block (EKB) being encrypted in such a manner that each key at a level in the hierarchical tree structure is encrypted using at least a node key at a lower level or a leaf key;

acquiring an encryption key (Kcon) by decrypting encrypted key data using said one of keys, which are members of the hierarchical tree structure and which are stored in the storage medium; and producing a decryption key (Kst) to be applied to the data stored in the storage medium by encrypting a value uniquely assigned to the information playback apparatus and then decrypting encrypted data Enc(Kst, DATA) stored in the storage medium using the decryption key (Kst).

In an embodiment of the information playback method according to the present invention, the value uniquely assigned to the information playback apparatus is a unique telephone number of the information playback apparatus or unique identification data of the information playback apparatus.

In an embodiment of the information playback method according to the present invention, the storage medium is a removable storage medium which can be removably attached to the information playback apparatus.

In an embodiment of the information playback method according to the present invention, said one of keys, which are members of the hierarchical tree structure and which are stored in the enabling key block (EKB), is a root key Kroot assigned to the root, that is, the top node of the hierarchical tree structure.

In an embodiment of the information playback method according to the present invention, said one of keys, which are members of the hierarchical tree structure and which are stored in the enabling key block (EKB), is renewable, and the information playback method further comprises the step of, by means of decrypting the enabling key block (EKB) using the device node key (DNK) set, acquiring said renewed one of keys, which are members of the heretical tree structure and which are stored in an enabling key block (EKB), said keys in the enabling key block (EKB) being encrypted in such a manner that each key at a level in the hierarchical tree structure is encrypted using at least a node key at a lower level or a leaf key.

According to a fifth aspect of the present invention, there is provided a program for causing a computer system to execute an information recording process in an information recording apparatus to store information into a storage medium, said information recording apparatus including storage means storing a device node key (DNK) set including leaf keys and node keys uniquely assigned to leaves and nodes, respectively, of a hierarchical tree structure, said leaves being assigned to respective different information recording apparatuses; and cryptographic means for encrypting data to be stored into the storage medium, the program comprising the steps of:

producing an encryption key (Kst) to be applied to the data to be stored, by encrypting, using an encryption key (Kcon), a value uniquely assigned to a specific data playback apparatus which will play back the data stored in the storage medium;

producing encrypted data Enc(Kst, DATA), by encrypting the data to be stored using the encryption key (Kst);

producing encrypted key data by encrypting the encryption key (Kcon) used in the encryption of the uniquely assigned value, using one of keys, which are members of the hierarchical tree structure and which are stored in an enabling key block (EKB), said keys in the enabling key block (EKB) being encrypted in such a manner that each key at a level in the hierarchical tree structure is encrypted using at least a node key at a lower level or a leaf key; and storing a data file including the encrypted data and the encrypted key data together with the enabling key block (EKB) into the storage medium.

According to a sixth aspect of the present invention, there is provided A program for causing a computer system to execute a playback process in an information playback apparatus to play back data stored in a storage medium, said information playback apparatus including storage means storing a device node key (DNK) set including leaf keys and node keys uniquely assigned to leaves and nodes, respectively, of a hierarchical tree structure, said leaves being assigned to respective different information playback apparatuses; and cryptographic means for decrypting the data stored in the storage medium, the program comprising the steps of:

by means of decrypting an enabling key block (EKB) using the device node key (DNK) set, acquiring one of keys, which are members of the heretical tree structure and which are stored in the enabling key block (EKB) stored in the storage medium, said keys in the enabling key block (EKB) being encrypted in such a manner that each key at a level in the hierarchical tree structure is encrypted using at least a node key at a lower level or a leaf key;

acquiring an encryption key (Kcon) by decrypting encrypted key data using said one of keys, which are members of the hierarchical tree structure and which are stored in the storage medium; and producing a decryption key (Kst) to be applied to the data stored in the storage medium by encrypting a value uniquely assigned to the information playback apparatus and then decrypting encrypted data Enc(Kst, DATA) stored in the storage medium using the decryption key (Kst).

The program according to the present invention may be provided to a general-purpose computer system capable of executing various program codes, by supplying a computer-readable storage medium, such as a CD, an FD, or an MO, in which the program is stored or by transmitting the program via a transmission medium such as a network.

The program defines various functions of the system, which are implemented by executing the program under the control of a processor so as to realize a cooperative operation on the system, thereby achieving functions and advantages similar to those achieved according to the other aspects of the present invention.

These and other objects and features of the present invention will become more apparent from the following detailed description of embodiments with reference to the accompanying drawings. In the present description, the term "system" is used to describe a logical collection of a plurality of devices, and it is not necessarily required that the plurality of devices are disposed in a single case.

BRIEF DESCRIPTION OF THE DRAWINGS

FIG. 4 is a diagram showing an example of an enabling key block (EKB) used to distribute various keys and data in the system according to the present invention.

FIG. 12 is a diagram showing a process of producing a simplified enabling key block (EKB), in the system according to the present invention.

DETAILED DESCRIPTION

BEST MODE FOR CARRYING OUT THE INVENTION

[Outline of System]

Figure 1:
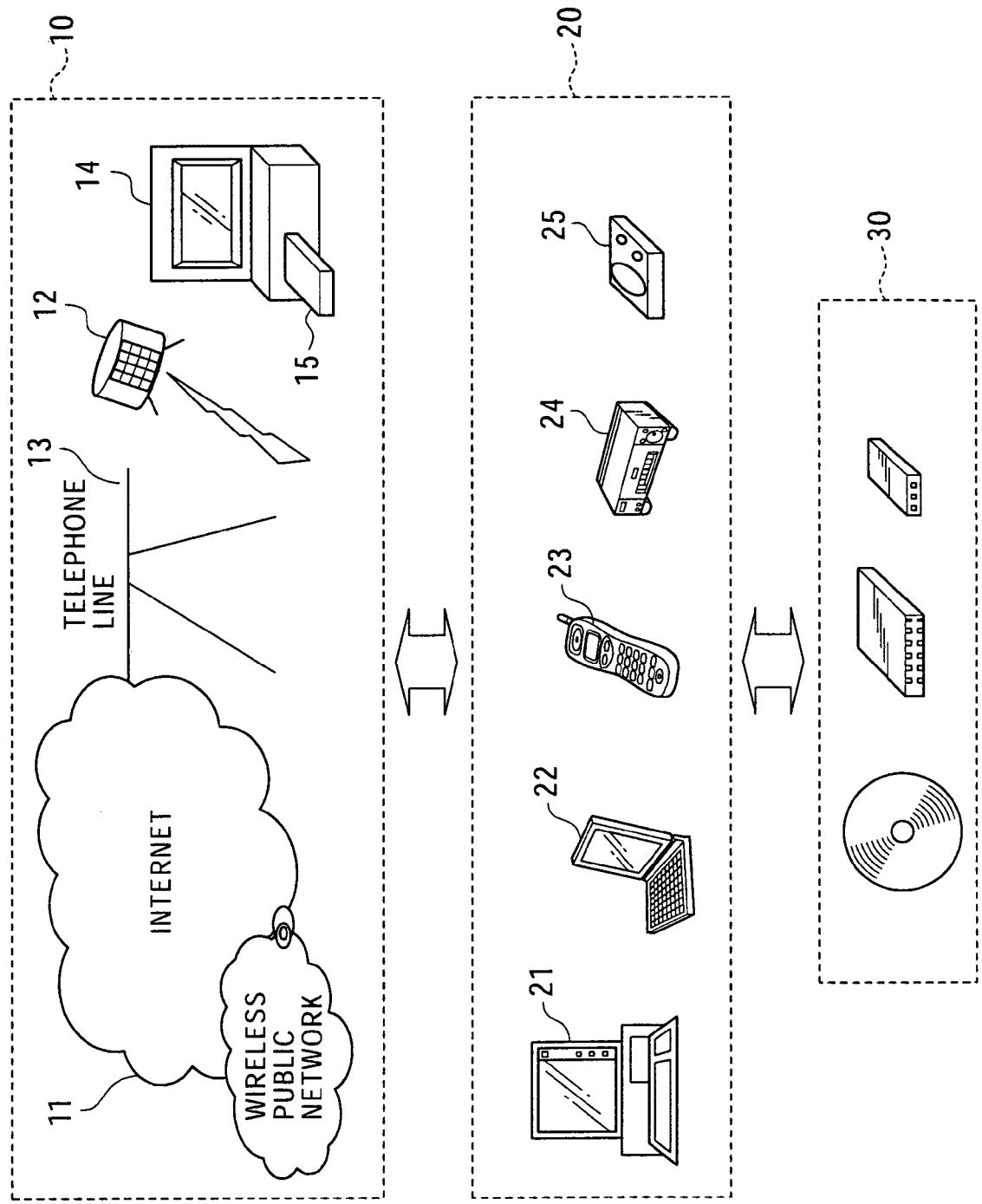
FIG. 1 is a diagram conceptually showing a manner in which a system according to the present invention is used.

FIG. 1 illustrates an example of a content distribution system based on a data processing system according to the present invention. Content distribution means 10 transmits various contents such as music, images, games and programs in the form of encrypted or non-encrypted data to data processing means 20. If the data processing means 20 receives a content, the data processing means 20 decrypts it, if necessary, and plays back image data or audio data or executes a program. The data processing means 20 may store the received content into an internal memory or a removable memory. Transmission of data between the content distribution means 10 and the data processing means 20 is performed via a network such as a telephone line or the Internet or via a storage medium such as such as a memory card, a DVD or a CD.

Specific examples of the content distribution means 10 include the Internet 11, satellite broadcasting 12, a telephone line 13, and a content distribution terminal 14 disposed, by a service provider or the like, in a station or a shop. To purchase a content from the content distribution terminal 14, a removable storage device 15 such as a memory card is attached to the content distribution terminal 14, and the purchased content is transferred into the removable storage device 15. In the present system according to the invention, when such data transferring is performed, processing including encryption is performed as will be described in detail later.

Specific examples of the data processing means 20 include a personal computer (PC) 21, a portable computer (PD) 22, a portable device 23 such as a portable telephone or PDA (Personal Digital Assistants), a recording/playback apparatus such as a DVD player or a CD player, a game terminal 24, and a recording/playback apparatus 25. Each device serving as data processing means 20 can acquire a content transmitted from the content distribution means 10 via communication means such as a network or from data processing means or data storage means 30.

Specific examples of the data storage means 30 include a DVD or a CD having storage means such as a flash memory and a memory card (such as a memory stick (trademark)) serving as storage means having the encryption/decryption capability.

Each device serving as data processing means 20 can store purchased content data into an internal memory or removable storage means such as a memory card.

In the system according to the present invention, when a content is output from the internal memory of the data processing means 20 to store it into removable storage means 30 and when a purchased content is output from the internal memory of the content distribution terminal 14 to store it into the removable storage device, processing including encryption of the content is performed as will be described in detail later so that the content can be played back only by an authorized user's device.

Figure 2:
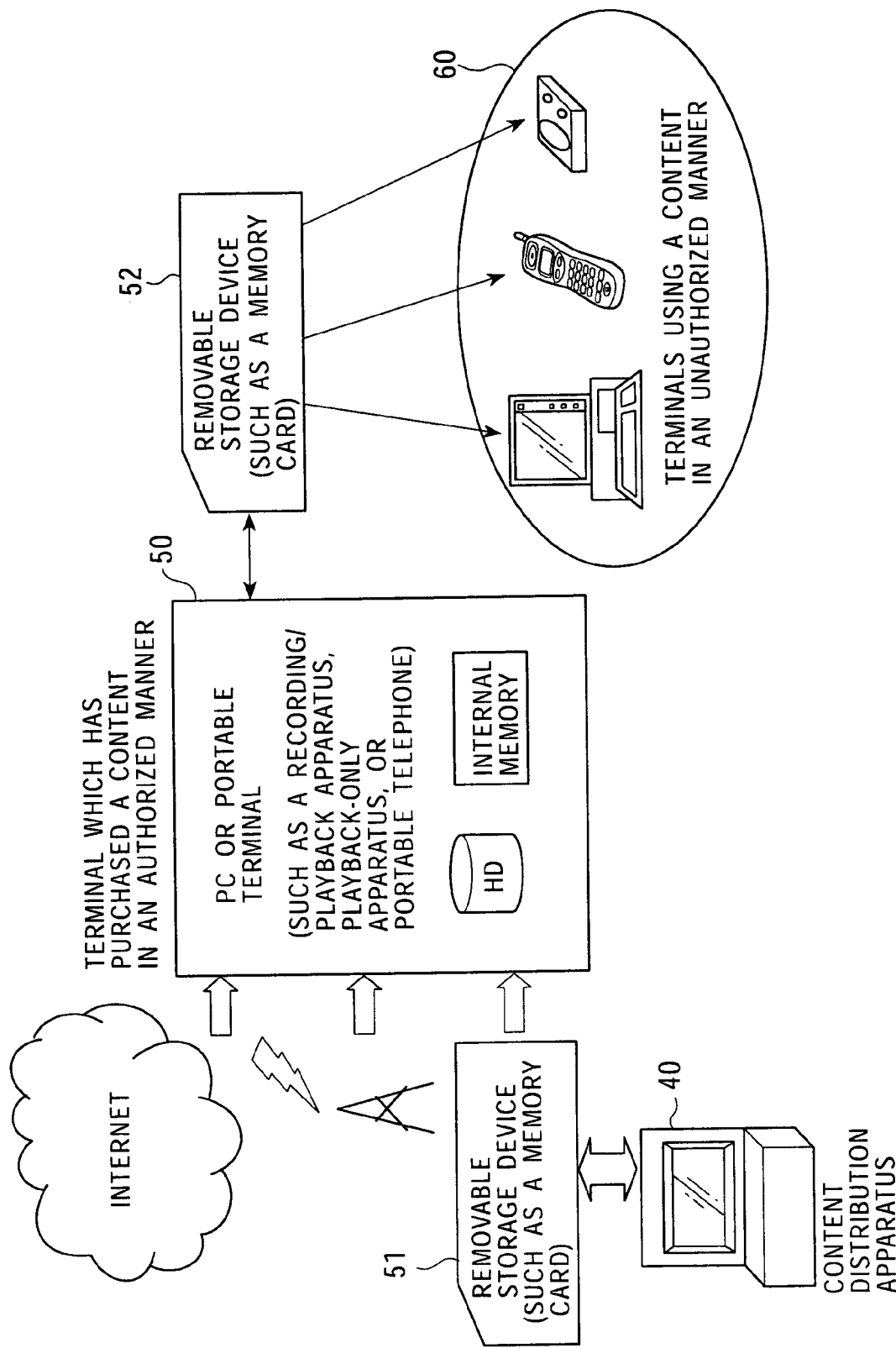
FIG. 2 is a diagram showing an example of the construction of the system according to the present invention and also showing an example of a manner in which data stored in a removable storage medium is used.

FIG. 2 shows a typical process of transferring content data. The example of the system shown in FIG. 2 includes an authorized content-purchasing terminal 50 and unauthorized non-purchasing terminals 60. In such a system, there is a possibility that a content purchased in an authorized manner by the authorized terminal 50 is used by an unauthorized non-purchasing terminal 60 via a removable storage device 52 such as a memory card (e.g., a memory stick (trademark)) including a built-in rewritable semiconductor memory such as a flash memory.

The authorized content-purchasing terminal 50 purchases a content such as audio data, image data or a program via a network such as the Internal or a telephone line or by attaching a removable storage device 51 to the content distribution terminal 40. Specific examples of contents include a pay content supplied to a user who pays a purchase price of the content and a content supplied to a specific subscriber. When the authorized content-purchasing terminal 50 stores content data, the authorized content-purchasing terminal 50 performs authentication and payment processing with a host computer of a service provider, as required.

The authorized content-purchasing terminal 50 can store a content purchased via an authorized procedure into an internal memory and can play back the content. The purchased content can be stored into the removable storage device 52. The removable storage device 52 including the purchased content stored therein can be attached to the unauthorized non-purchasing terminal 60. Furthermore, the removable storage device 51, in which a content purchased by the authorized content-purchasing terminal 50 by attaching the removable storage device 51 to the content distribution terminal 40, can be directly attached to the unauthorized non-purchasing terminal 60.

However, in the system according to the present invention, even if such the removable storage device 51 or 52 is attached to the unauthorized non-purchasing terminal 60, the content cannot be played back. That is, the content can be played back only by the authorized content-purchasing terminal 50.

When content data is stored into the removable storage device 51 or 52. shown in FIG. 2 from the authorized content-purchasing terminal 50 or from the content distribution terminal, the content data is encrypted such that the encrypted content data can be decrypted only the authorized content-purchasing terminal 50. The encryption process is described in further detail below.

[Distribution Keys on the Basis of a Tree Structure]

Various encryption keys used in a cryptographic process performed on a content, such as a content key used to encrypt the content and an content key encryption key used to encrypt the content key can be formed into a hierarchical tree structure such as that shown in FIG. 3 to supply the encryption keys to authorized devices having license, as described below.

Figure 3:
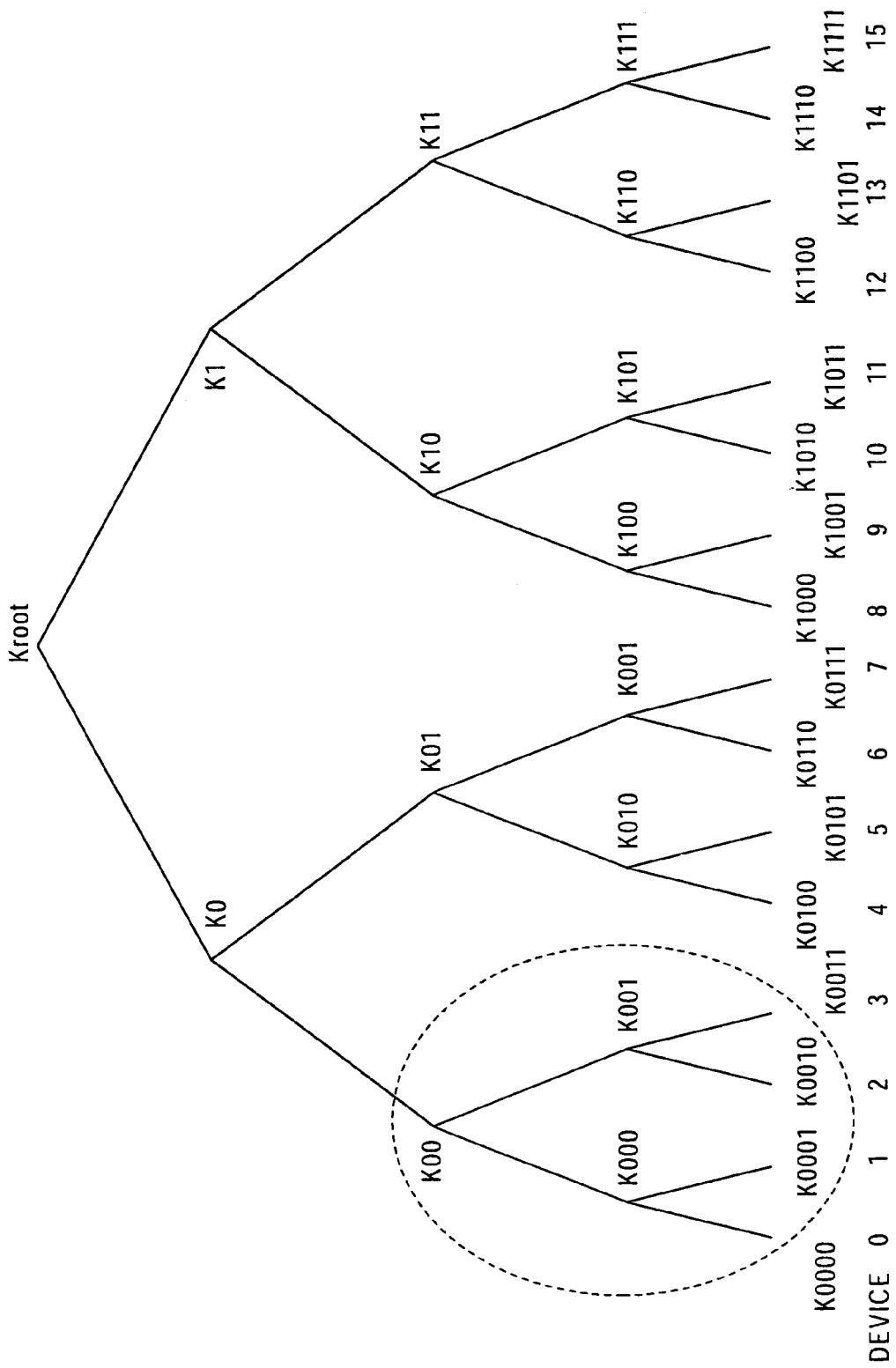
FIG. 3 is a tree structure diagram showing various keys and a process of encrypting data used or performed in the system according to the present invention.

In FIG. 3, numerals 0 to 15 at the bottom denote respective devices such as a content (music data) playback apparatus serving as the capability of the data processing means 20 capable of playing back or executing content data. That is, leaves in the hierarchical tree structure shown in FIG. 3 denote respective devices.

When devices 0 to 15 are produced or shipped, or at a proper time thereafter, a key set including a leaf key assigned to a leaf corresponding to a device and also including node keys assigned to respective nodes present in a path from that leaf to the root in the hierarchical tree structure shown in FIG. 3 is stored in a memory. The key set described above is referred to as a device node key (DNK) set. K0000 to K1111 shown at the bottom of FIG. 3 denote leaf keys assigned to the respective devices 0 to 15, and keys Kroot (root key) to K111 located at the respective levels from the top to the second level as counted from the bottom denote node keys.

In the tree structure shown in FIG. 3, for example, a device 0 has a device node key (DNK) set consisting of a leaf key K0000 and node keys K000, K00, K0, and Kroot. Similarly, a device 5 has a device node key (DNK) set consisting of K0101, K010, K01, K0, and Kroot, and a device 15 has a device node key (DNK) set consisting of K1111, K111, K11, K1, and Kroot. Although in the specific example shown in FIG. 3, the tree includes only sixteen devices 0 to 15 and the tree has a symmetric four-level structure, the tree may include a greater number of devices and may have a different number of levels other than 4.

Each device in the tree structure shown in FIG. 3 may use various types of storage media such as a storage device fixedly disposed in the device or a removable storage medium such as a memory card using a flash memory or the like, a DVD, a CD, or an MD. Furthermore, various types of application services may be provided via this tree structure. That is, the hierarchal tree structure for use in distribution of contents or content keys, such as that shown in FIG. 3, is formed so as to adapt to such-various types devices and various types applications.

In a system including such various types of devices and various types of applications, parts thereof are properly grouped. For example, in FIG. 3, a part enclosed by a dotted line is set as one group including devices 0, 1, 2, and 3, which use the same type of storage medium. For the devices included in this group enclosed by the dotted line, a common content in an encrypted form may be transmitted at the same time from a provider, or a content key that can be used by all devices in the group may be transmitted. Each device in the group transmits content payment data in an encrypted form to a provider or a settlement institution. When content providers or institutions such as a settlement institution transmit data to devices, they may transmit data at the same time to all devices 0, 1, 2, and 3 in the group enclosed by the dotted line in FIG. 3. The tree shown in FIG. 3 may include a plurality of such groups. Content providers or institutions such as a settlement institution, which transmit and receive data to and from devices, function as message data distribution means.

All node keys and leaf keys may be managed in a unified fashion by one key management center, or node keys and leaf keys may be managed on a group-by-group basis by message data distribution means such as providers or settlement institutions that transmit and receive data to and from the respective groups. In a case where secrecy of a key is broken, node keys and leaf keys are renewed by the key management center, the providers, or the settlement institutions.

In the present tree structure, as can be seen from FIG. 3, all three devices 0, 1, 2, and 3 included in one group have common node keys K00, K0, and Kroot. Use of such common node keys makes it possible to provide, for example, a common content key only to the devices 0, 1, 2, and 3. For example, if the node key K00 that are held by all devices 0, 1, 2, and 3 is employed as a content key, it is possible to provide the content key that can be used in common only by the devices 0, 1, 2, and 3, without necessitating an additional key transmission process. If a content key Kcon is encrypted using the node key K00 and a value Enc(K00, Kcon) obtained as the result of encryption is distributed to the devices 0, 1, 2, and 3 via a network or a storage medium, then only the devices 0, 1, 2, and 3 can acquire the content key Kcon by decrypting the encryption value Enc(K00, Kcon) using the node key K00 that are held in common by these devices. Herein, Enc(Ka, Kb) denotes data that is obtained by encrypting Kb using Ka.

At a some point of time t, if it turns out that keys K0011, K001, K00, K0, and Kroot held by the device 3. have been analyzed by a hacker and secrecy of the key has been broken, it is needed to isolate the device 3 from the system to protect data transmitted or received in the system (group including the devices 0, 1, 2, and 3). For this purpose, it is needed to change the node keys K001, K00, K0, and Kroot to new keys K(t)001, K(t)00, K(t)0, K(t)root and transmit the new keys to the devices 0, 1, and 2. Herein, K(t)aaa denotes a renewed key of generation of t obtained by renewing a key Kaaa.

Distribution of renewed keys is described below. Renewal of keys is performed by supplying block data called an enabling key block (EKB) such as that shown in FIG. 4(A) to the respective devices by transmitting it via a network or by supplying a storage medium including the enabling key block (EKB) stored therein to the respective devices. The enabling key block (EKB) is made up of data obtained by encrypting renewed keys. The enabling key bloc (EKB) is also called a key renewal block (KRB).

The enabling key block (EKB) shown in FIG. 4 includes data which can be processed only by devices which need renewal of node keys, that is, the data included in the EKB can be decrypted by the device node key (DNK) set of a device. In the example shown in FIG. 4, the block data is formed for the purpose of supplying renewed node keys of generation of t to devices 0, 1, and 2 in the tree structure shown in FIG. 3, wherein the block data can be decrypted using device node key (DNK) sets held by the respective devices 0, 1, and 2. The devices 0 and 1 can acquire renewed node keys K(t)00, K(t)0, and K(t)root by decrypting the enabling key block (EKB), and the device 2 can acquire renewed node keys K(t)001, K(t)00, K(t)0, and K(t)root by decrypting the enabling key block (EKB).

As shown in FIG. 4(A), the EKB includes a plurality of encrypted keys. An encrypted key Enc(K0010, K(t)001) described at the bottom is produced by encrypting renewed node key K(t)001 by the leaf key K0010 held by the device 2, and thus the device 2 can acquire the renewed node key K(t)001 by decrypting Enc(K0010, K(t)001) using the leaf key held by the device 2. Using this renewed node key K(t)001 obtained via decryption, an encrypted key Enc(K(t)001, K(t)00) in the second row as counted from the bottom in FIG. 4(A) can be decrypted into the renewed node key K(t)00. Similarly, an encrypted key Enc(K((t)00, K(t)0) in the second row as counted from the top in FIG. 4(A) can be decrypted into the renewed node key K(t)0, and an encrypted key Enc(K(t)0, K(t)root) at the top in FIG. 4(A) can be decrypted into K(t)root. On the other hand, for the devices K0000 and K0001, the node key K000 is not needed to renew, and thus only renewed keys K(t)00, K(t)0, and K(t)root are needed for the devices K0000 and K0001. The devices K0000 and K0001 acquire K(t)00 by decrypting an encrypted key Enc(K000, K(t)00) at the third row as counted from the top in FIG. 4(A), and acquire the renewed node key K(t)0 by decrypting the encrypted key Enc(K(t)00, K(t)0) at the second row as counted from the top in FIG. 4(A). Furthermore, K(t)root is acquired by decrypting the encrypted key Enc(K(t)0, K(t)root) at the top in FIG. 4(A). The devices 0, 1, and 2 can acquire the renewed keys K(t)001, K(t)00, K(t)0, and K(t)root in the above-described manner. In FIG. 4(A), indexes indicate the absolute addresses of the node keys and leaf keys used as decryption keys.

In a case where the node keys K(t)0 and K(t)root at high levels of the tree structure shown in FIG. 3 are not needed to renew, but only the node key K00 is needed to renew, the enabling key block (EKB) may be formed such as shown in FIG. 4(B) whereby the renewed node key K(t)00 can be distributed to the devices 0, 1, and 2.

The EKB shown in FIG. 4(B) may be used to distribute a new content key to be used in common by a particular group. For example, let us assume that the devices 0, 1, 2, and 3 in the group enclosed by the dotted line in FIG. 3 use a particular type of storage media and that a new common content key K(t)con is needed. In this case, the renewed content key K(t)con for use in common is encrypted using K(t)00 obtained by renewing the node key K00 used in common by the devices 0, 1, 2, and 3, and resultant encrypted data Enc(K(t), K(t)con) is distributed together with the EKB shown in FIG. 4(B). This method of distribution allows data to be distributed such that the distributed data cannot be decrypted by the other devices such as a device 4.

That is, the devices 0, 1, and 2 can acquire the content key K(t)con that is valid at the point of time t by decrypting the encrypted data described above using K(t)00 that can be obtained by processing the EKB.

[Distribution of Content Key Using EKB]

Figure 5:
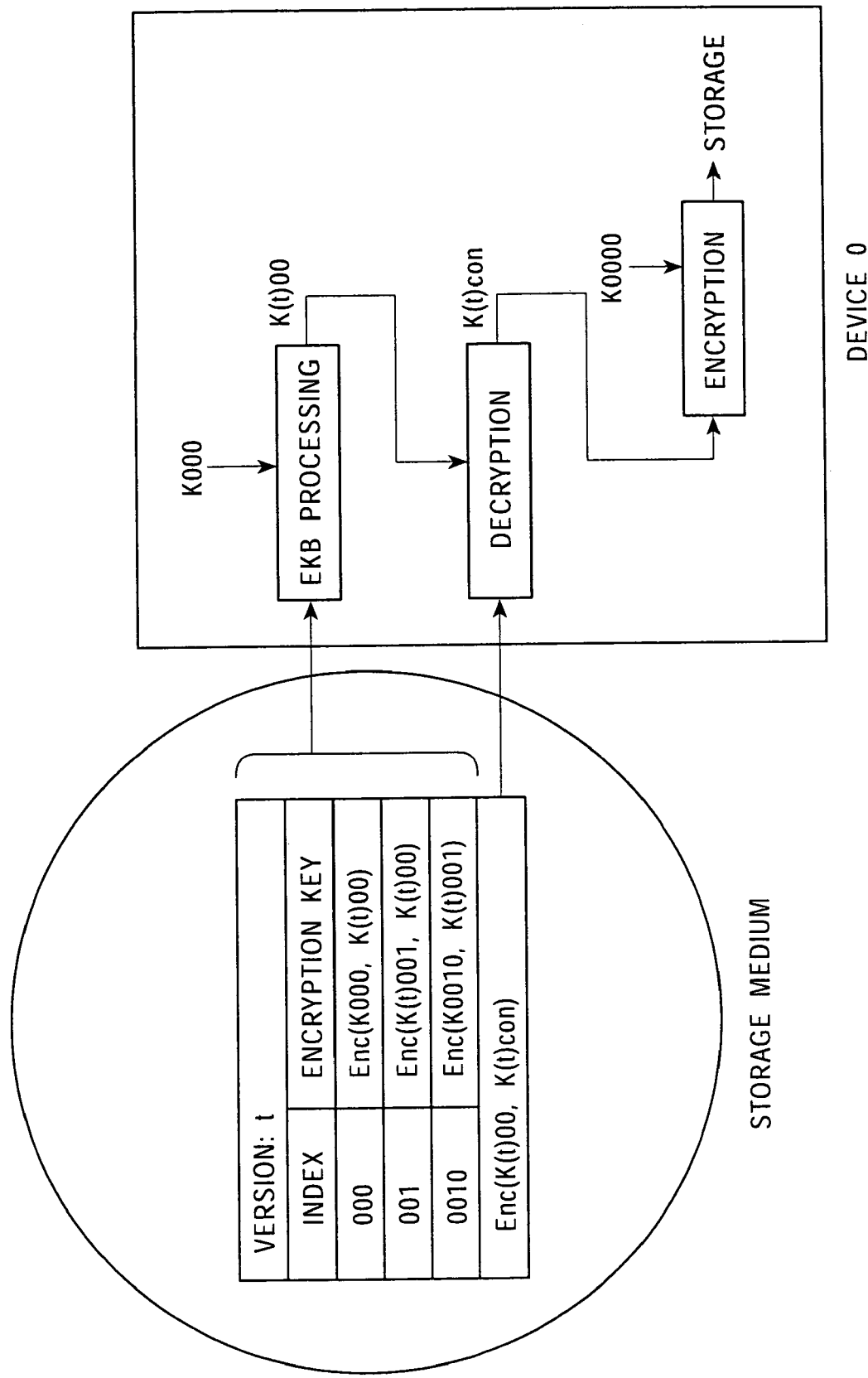
FIG. 5 is a diagram showing an example of a manner of distributing a content key using an enabling key block (EKB) and an example of a decryption process, in the system according to the present invention.

FIG. 5 illustrates a specific example of a process performed by the device 0 to obtain the content key K(t)con which is valid at the point of time t from the data Enc(K(t) 00, K(t)con), which has been produced by encrypting the new common content key K(t)con using K(t)00 and supplied together with the EKB shown in FIG. 4(B) to the device 0 via a storage medium. In this case, the content key K(t)con is message data encrypted by the EKB.

As shown in FIG. 5, the device 0 produces the node key K(t)00 by processing the EKB of the generation of t stored in the storage medium using the node key K000, which is already held by the device 0, in a similar manner as described above. Thereafter, the renewed content key K(t)con is acquired by means of decryption using the renewed node key K(t)00. Furthermore, the renewed content key K(t)con is encrypted using the leaf key K0000 held only by the device 0 so that the content key K(t)con can be used at any time thereafter.

[Format of EKB]

Figure 6:
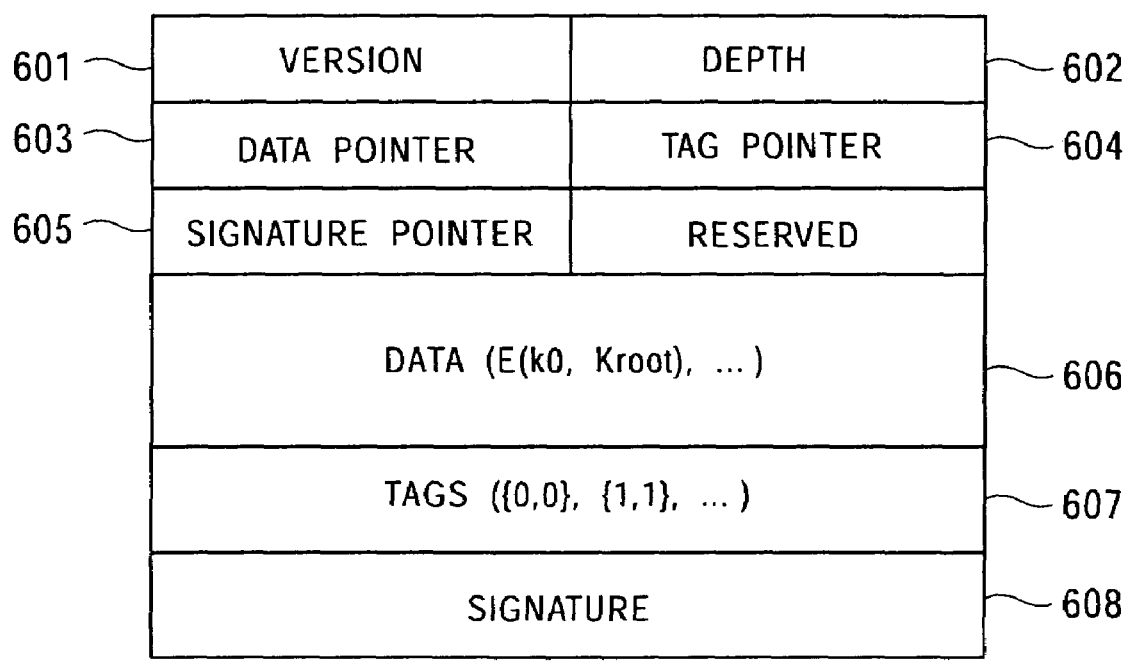
FIG. 6 is a diagram showing an example of a format of an enabling key block (EKB) used in the system according to the present invention.

FIG. 6 shows an example of a format of an enabling key block (EKB). A version 601 is an identifier indicating the version of the enabling key block (EKB). The version serves not only to identify the newest EKB but also to indicate the correspondence with contents. The depth indicates the number of layers of a hierarchical tree of devices to which the enabling key block (EKB) is distributed. A data pointer 603 points to a location of data field in the enabling key block (EKB). A tag pointer 604 points to a location of a tag field, and a signature pointer 605 points to a location of a signature.

The data field 606 is used to store encrypted data such as a renewed node key. For example, data of encrypted keys associated with a renewed node key, such as that shown in FIG. 5, is stored in the data field.

Figure 7:
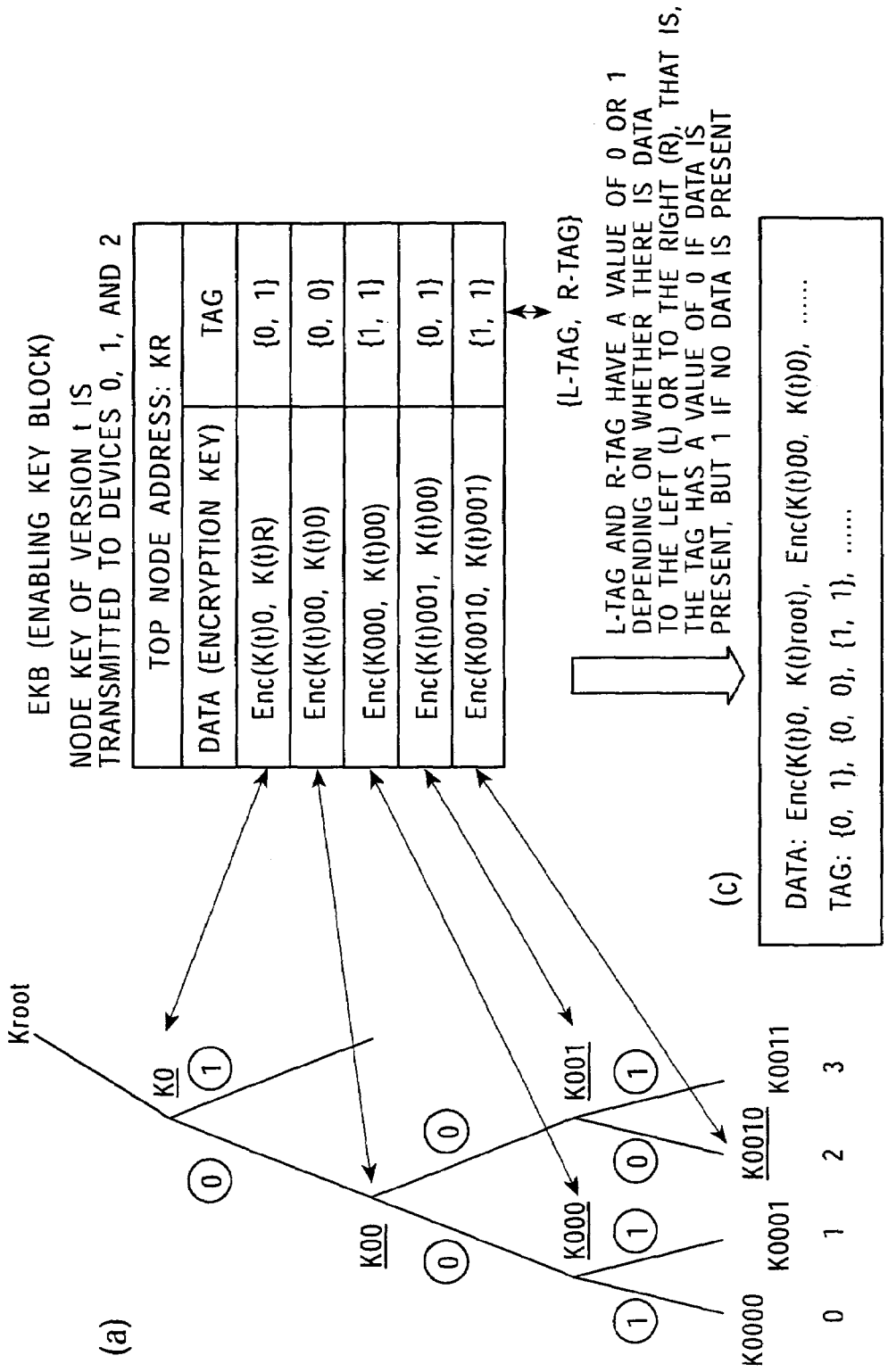
FIG. 7 is a diagram illustrating tags in an enabling key block (EKB) used in the system according to the present invention.

The tag field 607 is used to store tags indicating the locations of the encrypted node keys and leaf key stored in the data field. The rule of determining the tags is described below with reference to FIG. 7. In a specific example shown in FIG. 7, the enabling key block (EKB) described above with reference to FIG. 4(A) is transmitted as the data. A table (b) in FIG. 7 shows the data that is transmitted in this specific example. Herein, the address of a top node in the encrypted keys is referred to as a top node address. In this case, because a renewed root key K(t)root is included in the encrypted keys, the top node address becomes Kroot. The data Enc(K(t)0, K(t)root) at the top correspond to a location of the hierarchical tree shown in (a) of FIG. 7. The location in the hierarchical tree for the next data Enc(K(t)00, K(t)0) is lower left to the location of the previous data. When there is data, the tag is set to 0, while the tag is set to 1 when there is no data. The tag is represented in the form of {L-tag, R-tag}, wherein L-tag denotes a left tag and R-tag denotes a right tag. In the case of the data Enc(K(t)0, K(t)root) in the top row, there is data to the left thereof, and thus the L-tag is set to 0, while the R-tag is set to 1 because there is no data to the right thereof. Tags are set for all data in a similar manner. As a result, a sequence of data and a sequence of tags are produced as shown in FIG. 7(c).

The tags indicate the locations of data Enc(Kxxx. Kyyy) in the tree structure. Key data Enc(Kxxx, Kyyy) stored in the data field is a simple sequence of encrypted keys, and thus the tags are used to indicate the locations, in the tree, of encrypted keys stored in the data field. Instead of using the tags, the locations in the tree may be represented by adding node indexes to the corresponding encrypted data, as described earlier with reference to FIG. 4. More specifically, the node indexes may be added as follows.

```
0: Enc(K(t)0, K(t)root)
00: Enc(K(t)00, K(t)0)
000: Enc(K((t)000, K(T)00)
...
```

However, use of the indexes results in redundancy in the data, and thus a greater data size is needed to describe the data, which is undesirable in transmission via a network. In contrast, if the tags are used as index data indicating the locations of keys, the locations of keys can be indicated by data with a smaller data size.

Referring back to FIG. 6, the format of EKB is described further. A signature is a digital signature written by a key management center, a content provider, or a settlement institution, which has issued the enabling key block (EKB). When a device receives the EKB, the device verifies the signature to determine whether the received enabling key block (EKB) is a correct one issued by an authorized enabling key block (EKB) issuer.

[Distribution of a Content Key and a Content Using an EKB]

In the example described above, only the content key is transmitted together with the EKB. A content encrypted using a content key may also be transmitted together with a content key encrypted using a content key encryption key and the content key encryption key encrypted using an EKB, as described below.

Figure 8:
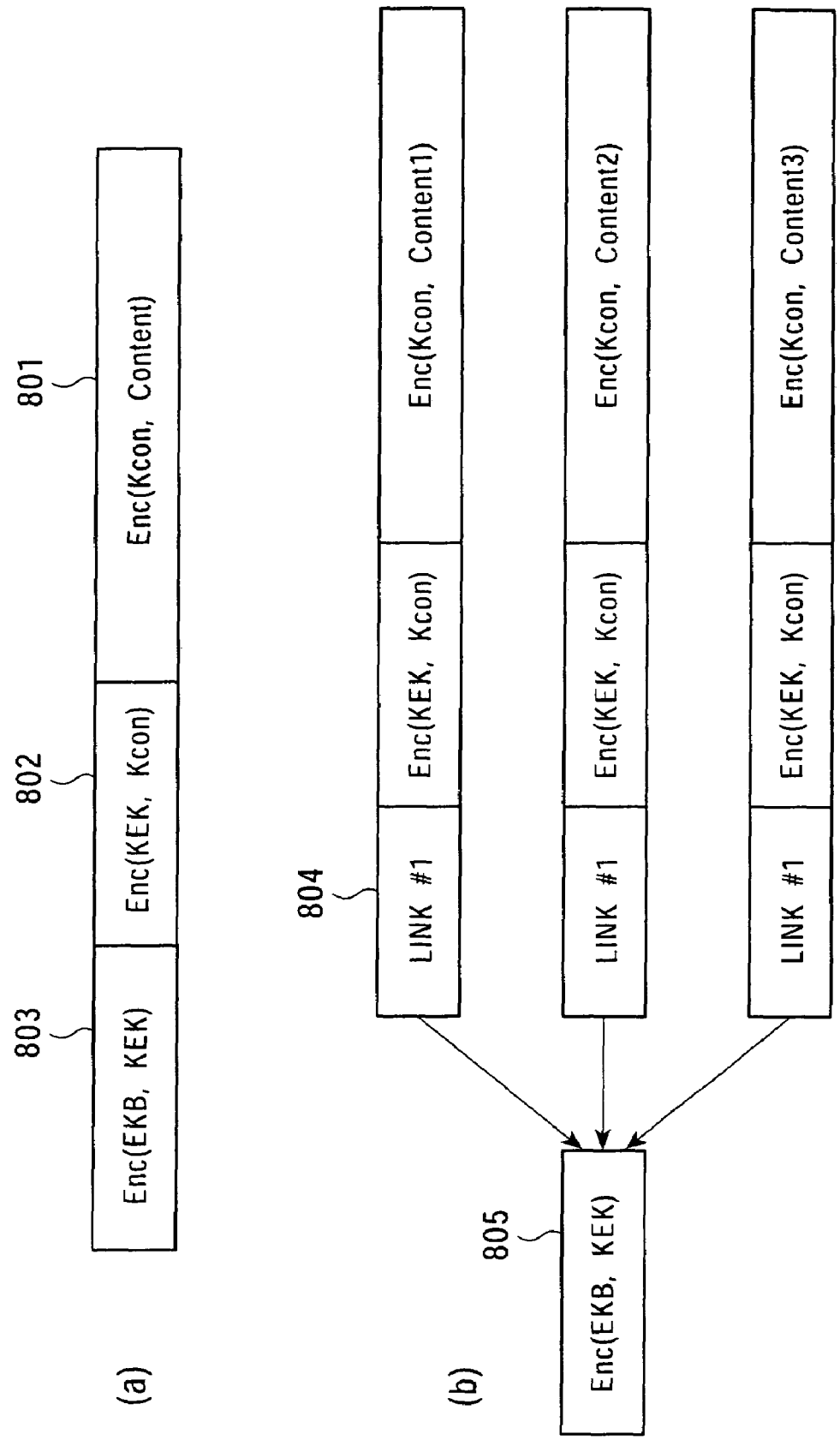
FIG. 8 is a diagram showing an example of a data format used to distribute an enabling key block (EKB) together with a content key and a content, in the system according to the present invention.

FIG. 8 shows a data format used for the present purpose. In the data format shown in FIG. 8(a), Enc(Kcon, content) 801 denotes data produced by encrypting the content using the content key (Kcon). Enc(KEK, Kcon) 802 is data produced by encrypting the content key (Kcon) using the content key encryption key (KEK). Enc(EKB, KEK) 803 denotes data produced by encrypting the content key encryption key KEK using the enabling key block (EKB).

Herein, the node key (K000, K00, ... ) shown in FIG. 3 or the root key (Kroot) may be employed as the content key encryption key. KEK, or a key encrypted using the node key (K000, K00, ... ) or the root key (Kroot) may be employed.

FIG. 8(b) shows a data format that may be used when a plurality of contents are stored on a medium, and all contents use the same encrypted data Enc(EKB, KEK) 805. In this case, data pointing to Enc(EKB, KEK) is added to the respective content data, instead of adding the same Enc (EKB, KEK) to the respective content data.

Figure 9:
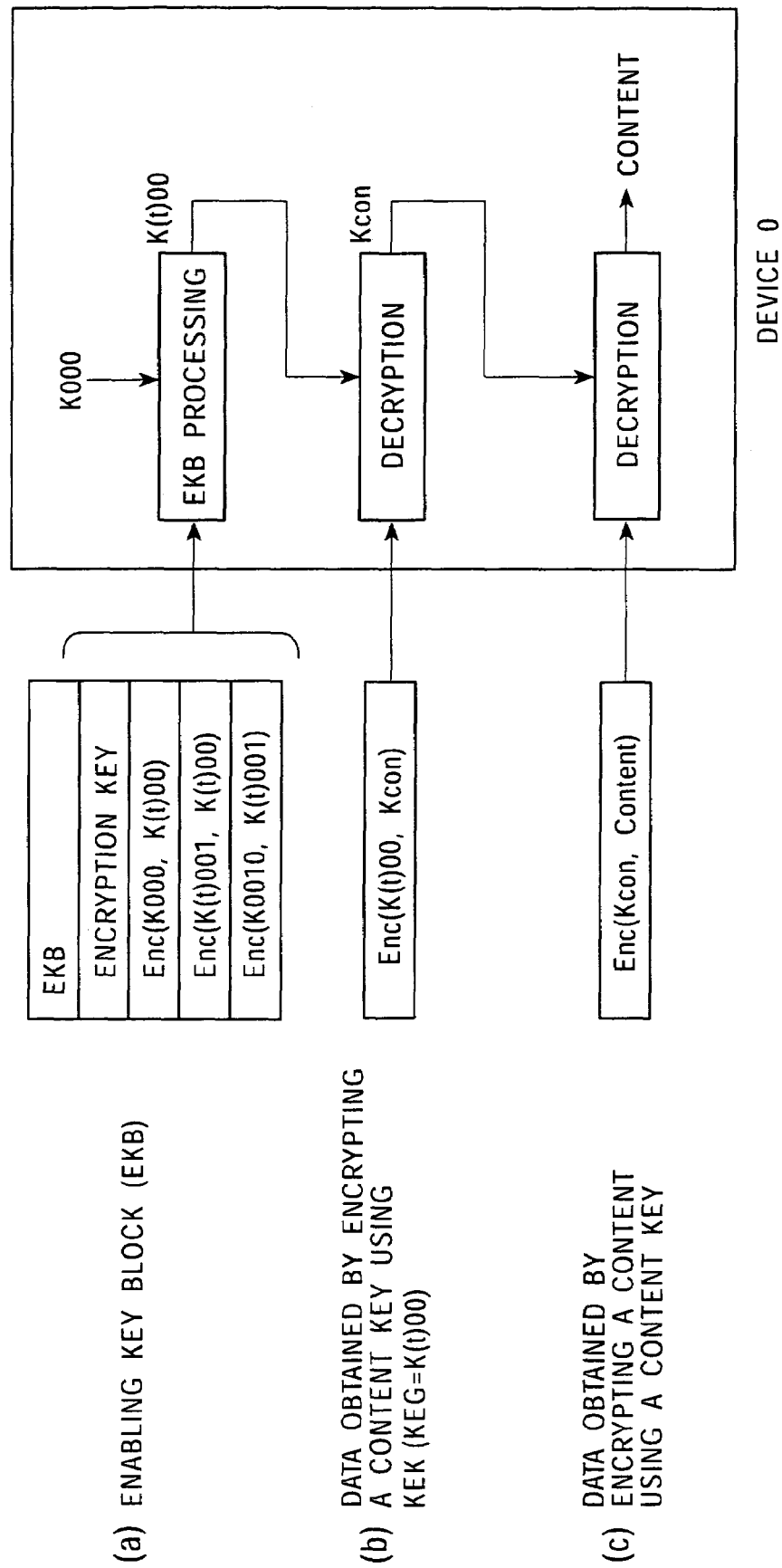
FIG. 9 is a diagram showing an example of a process performed by a device in a case where an enabling key block (EKB) is distributed together with a content key and a content, in the system according to the present invention.

FIG. 9 shows an example in which the content key encryption key KEK is employed as a renewed node key K(t)00 to be used instead of the node key K00 shown in FIG. 3. In the case where the device 3 in the group enclosed by the dotted line in FIG. 3 has been revoked because of exposure of secrecy of a key, if the enabling key block (EKB) shown in FIG. 9(a), data produced by encrypting the content key (Kcon) using the content key encryption key (KEK=K(t)00) shown in FIG. 9(b), and data produced by encrypting the content using the content key (Kcon) are supplied to the other members in the group, that is, to the devices 0, 1, and 2, the devices 0, 1, and 2 can acquire the content.

A decryption procedure performed by the device 0 is shown on the right-hand side of FIG. 9. First, the device 0 acquires the content key decryption key (KEK=K(t)00) from the received enabling key block by performing a decryption process using the leaf key K000 held by the device 0. The device 0 then acquires the content key Kcon by means of decryption using K(t)00 and finally acquires the content by means of decryption using the content key Kcon. Thus, the device 0 can obtain the content. Similarly, the devices 1 and 2 can acquire the content key encryption key (KEK=K(t)00) by processing the EKB according to their own procedures and can further acquire the content.

Even if the devices 4, 5, 6, and so on of the other groups shown in FIG. 3 can receive similar data (EKB), they cannot acquire the content key encryption key (KEK=K(t)00) by using a set of leaf keys and node keys, that is, a device node key (DNK) set held by them. Similarly, the revoked device 3 can also not acquire the content key encryption key (KEK=K(t)00) by using a set of leaf keys and node keys, that is, a device node key (DNK) set held by the device 3. Thus, it is ensured that only the authorized devices can decrypt the content and can use the decrypted content.

Thus, the above-described method of transmitting a content key using an EKB makes it possible to securely distribute an encrypted content using a small amount of data such that only authorized users can decrypt the encrypted content.

In the example described above, the enabling key block (EKB), the content key, and the encrypted content, are securely distributed via the network. Alternatively, the enabling key block (EKB), the content key, and the encrypted content, may be stored on a storage medium such as a DVD or a CD and the storage medium may be supplied to a user thereby providing the enabling key block (EKB), the content key, and the encrypted content to the user. In this case, if the encrypted content and the enabling key block (EKB) are stored on the same storage medium so that the encrypted content can be decrypted using the content key that can be obtained by decrypting the enabling key block (EKB), it is possible to realize a simple content distribution system that allows only limited authorized user devices to use a distributed encrypted content by decrypting it using a leaf key or node keys held by the user devices.

Figure 10:
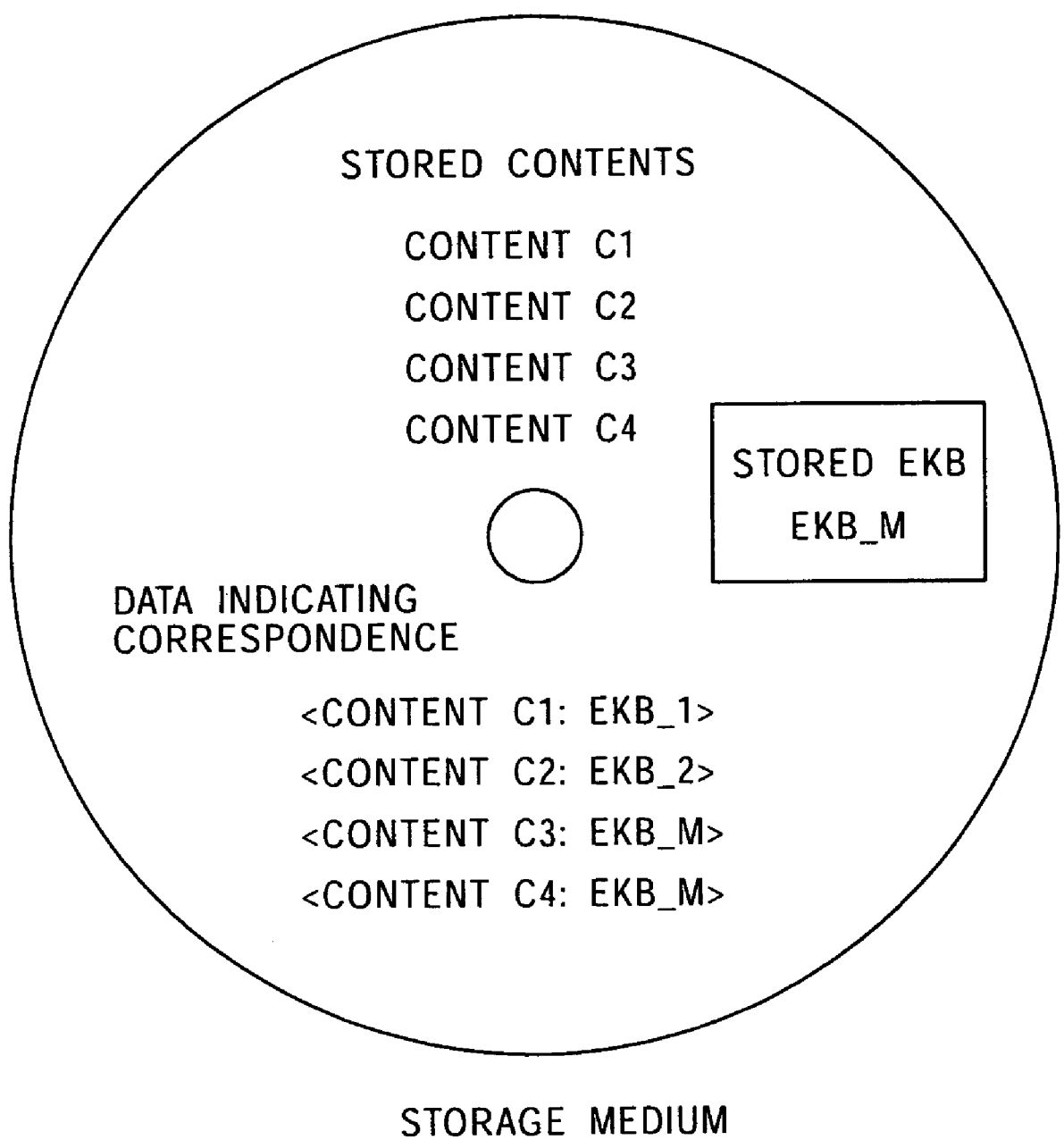
FIG. 10 is a diagram showing correspondence between an enabling key block (EKB) and a content for a case in which an enabling key block (EKB) and contents are stored on a storage medium, in the system according to the present invention.

FIG. 10 shows an example in which encrypted contents and enabling key blocks (EKB) are stored together on a storage medium. In this specific example shown in FIG. 10, contents C1 to C4 are stored on a storage medium, and data indicating the correspondence between the respective contents and enabling key blocks (EKB) is stored on the same storage medium, and furthermore an enabling key block of version M (EKB_M) is also stored. For example, EKB_1 is used to produce a content key Kcon1 used to encrypt the content C1, and EKB_2 is used to produce a content key Kcon2 used to encrypt the content C2. In this example, because the enabling key block (EKB_M) of version M is stored on the storage medium, and because the contents C3 and C4 are related to the enabling key block (EKB_M), it is possible to acquire the content key for the contents C3 and C4 by decrypting the enabling key block (EKB_M). On the other hand, because EKB_1 and EKB_2 are not stored on the disk, it is needed to acquire them via another means such as a network communication or another storage medium to decrypt the content keys C1 and C2.

[Categorization of a Hierarchical Tree Structure]

By employing a hierarchical tree structure including a root key, node keys, and leaf keys, as shown in FIG. 3, it is possible to distribute not only a content key in an encrypted form but also various encrypted data such as an authentication for use in mutual authentication, an ICV (Integrity Check Value) generation key used to check whether communication data has been tampered with, a program code, or data, together with an enabling key block (EKB). The hierarchical tree structure in which node keys or the like are defined can be divided into sub tree structures according to categories of devices. This makes it possible to renew keys or distribute encryption keys or data in a more efficient manner, as described below.

Figure 11:
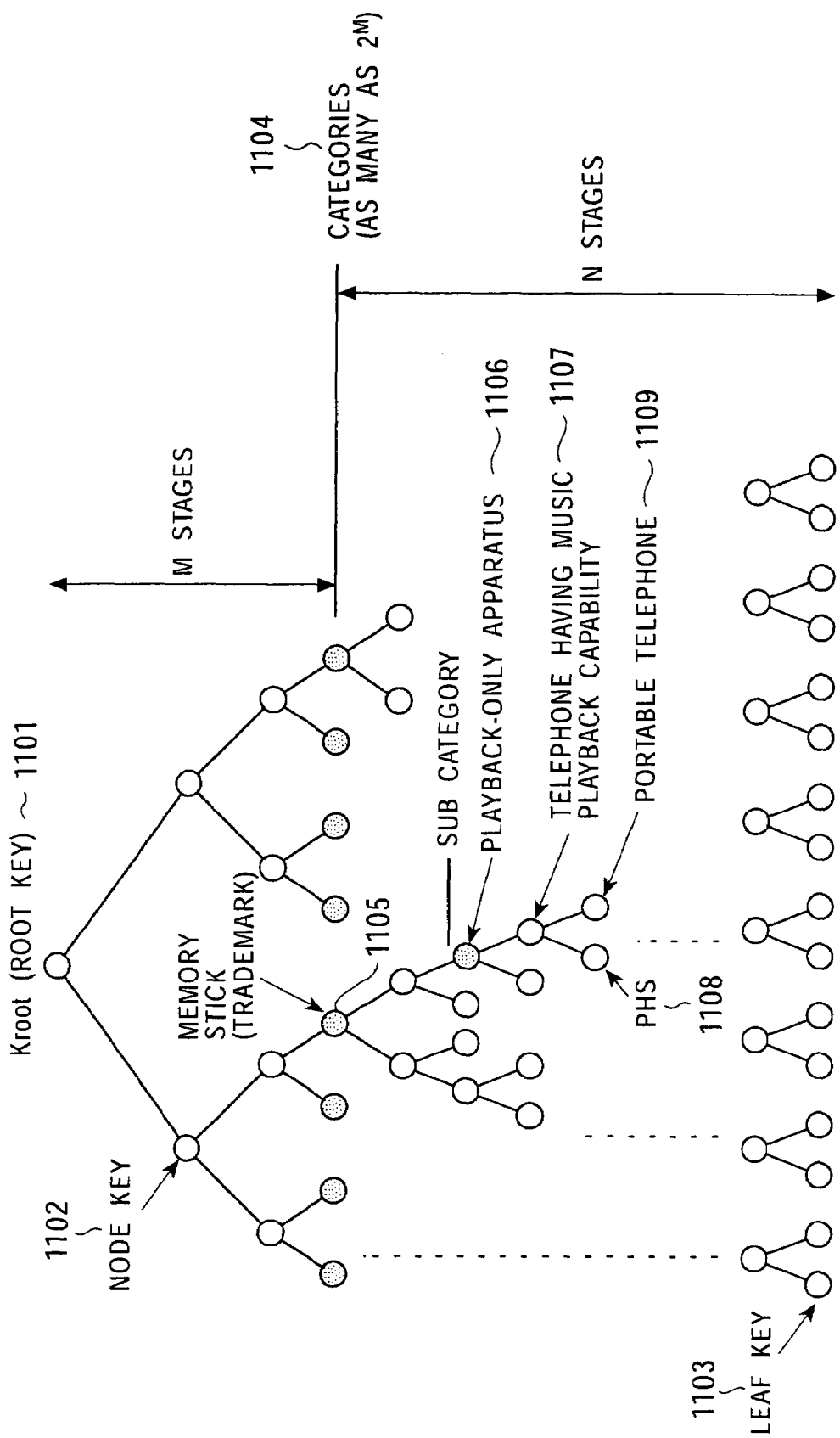
FIG. 11 is a diagram showing an example of categorization using category subtrees in a hierarchical tree structure, in the system according to the present invention.

FIG. 11 shows an example of categorization of the hierarchical tree structure. In this example shown in FIG. 11, a root key Kroot 1101 is disposed at the top of the hierarchical tree structure, node keys 1102 are disposed at middle levels, and leaf keys 1103 are disposed at the bottom. Each device has a set of keys including a leaf key of the device itself, the root key, and node keys existing in the path from the leaf key to the root key.

By way of example, it is assumed herein that nodes at an Mth level as counted from the top are defined as category nodes 1104. That is, the nodes at the Mth level are employed to define specific categories of devices. One node at the Mth level is employed as a top node, and nodes and leaves that exist at the (M+1)th level and lower levels in paths originating from that top node are defined to be included in the category assigned to the top node.

For example, one node 1105 at the Mth level in FIG. 11 is employed to define a category of "memory sticks (trade mark)", and nodes and leaves existing in paths originating from this node are defined to correspond to various devices using a memory stick belonging to the category of "memory sticks". That is, a set of nodes including the node 1105 and associated lower-level nodes and leaves is defined to belonging to the category of memory sticks.

Furthermore, a level that is lower than the Mth level by a proper number of levels may be employed as sub-category nodes 1106. For example, as shown in FIG. 11, a node that exists in a path originating from the category node 1105 of "memory sticks" and that is located two levels lower than the category node 1105 is employed as a sub-category node of "playback apparatuses" included in the category of devices using memory sticks. Similarly, a node 1107 below the sub-category node 1106 of playback apparatuses is employed as a sub-category node of "telephones having a music playback capability" included in the category of playback apparatuses. At a further lower level, a sub-category node 1108 of "PHS" and a sub-category node 1109 of "portable telephone" are defined such that both sub-categories belong to the category of telephone having music playback capability. Leaves at a lower level connected to the "PHS" node 1108 are assigned to PHSs capable of using a memory stick, and leaves at a lower level connected to the "portable telephone" node 1109 are assigned to portable telephones capable of using a memory stick.

The categories and subcategories can be defined according to not only the types of devices but also manufacturers, content providers, or settlement institutions, and those node may be respectively managed by them. That is, the categories and subcategories may be defined so as to have arbitrary scopes in accordance with, for example, processing, management organizations, or services provided (hereinafter, units in the categories or sub-categories are generically referred to as entities). For example, if one category node is set as a top node for dedicated use of a game machine XYZ provided by a game machine manufacturer, it becomes possible to sell game machines XYZ in which node keys and leaf keys below the top node are stored. After selling the game machines XYZ, encrypted contents or keys may be supplied or keys may be renewed by supplying an enabling key block (EKB) including the top node key and node keys and leaf keys below the top node so that only devices below the top node can use the supplied data.

As described above, when one node is given as a top node, lower-level nodes arising from the top node are defined as belonging to a category or a sub-category assigned to that top node, thereby making it possible for a manufacturer or a content provider that manages one top node of one category or sub-category to produce an enabling key block (EKB) including that top node without having to taking into account the other categories or sub-categories and distribute the resultant enabling key block (EKB) to devices corresponding to the top node or the lower-level nodes arising from the top nodes, and thus making it possible to renew a key without exerting any influence on devices belonging to the other categories that do not belong to that top node.

[Distribution of a Key Using a Simplified EKB]

In the tree structure described earlier with reference to FIG. 3, when a key such as a content key is sent to a specific device (leaf), an enabling key block (EKB) is produced such that it can be decrypted by a leaf key or a node key held by the device to which the key is to be sent, and the resultant enabling key block (EKB) is provided to the device. For example, in the tree structure shown in FIG. 12(a), when a key such as a content key is transmitted to devices a, g, and j at corresponding leaves, an enabling key block (EKB) that can be decrypted by those nodes a, g, and j are produced and transmitted thereto.

More specifically, when a content key K(t)con is encrypted using a renewed root key K(t)root and transmitted together with an EKB, the devices a, g, and j can acquire K(t)root by processing the EKB using the leaf key and the node keys shown in FIG. 12(b), and further can acquire the content key K(t)con by performing decryption using the acquired renewed root key K(t)root.

Figure 13:
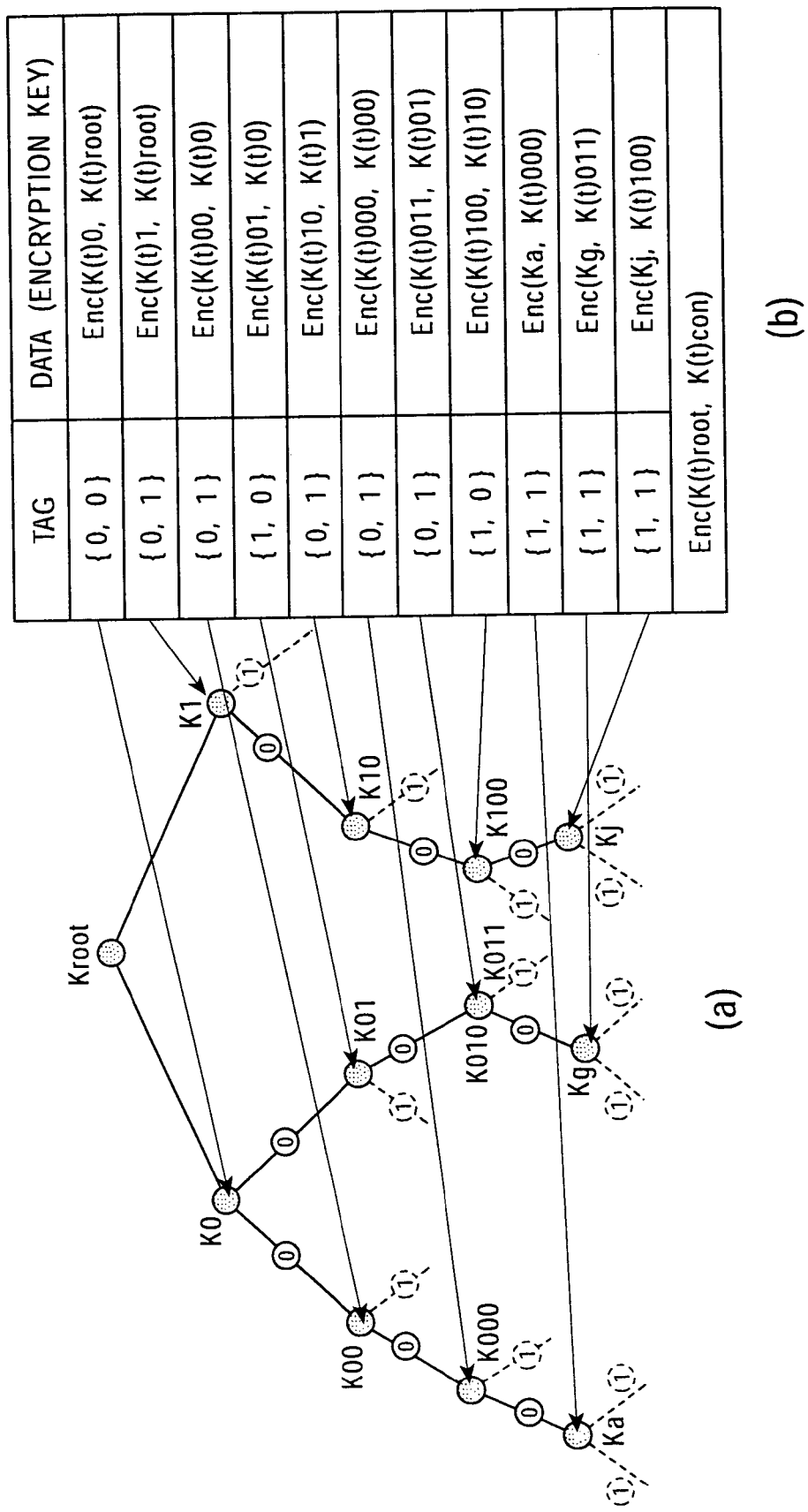
FIG. 13 is a diagram showing a process of producing an enabling key block (EKB), in the system according to the present invention.

FIG. 13 shows the enabling key block (EKB) that is transmitted in this specific case. The enabling key block (EKB) shown in FIG. 13 is produced in accordance with the EKB format described earlier in accordance with FIG. 6, and thus the EKB includes data (encrypted keys) and tags corresponding to the data. As described earlier with reference to FIG. 7, left (L) and right (R) component of each tag has a value of 0 or 1 depending on whether data exits in L or R directions.

If a device receives the enabling key block (EKB), the device sequentially decrypts the encrypted keys included in the enabling key block (EKB) on the basis of the tags thereby sequentially acquiring renewed keys from a level to a higher level. As shown in FIG. 13, the data size of the enabling key block (EKB) increases with the number of levels between the root and the leaves (the number of levels is referred to as the depth). The depth (number of levels) increases with the number of devices (leaves), and thus the data size of the EKB becomes great when keys are transmitted to a great number of devices.

Figure 14:
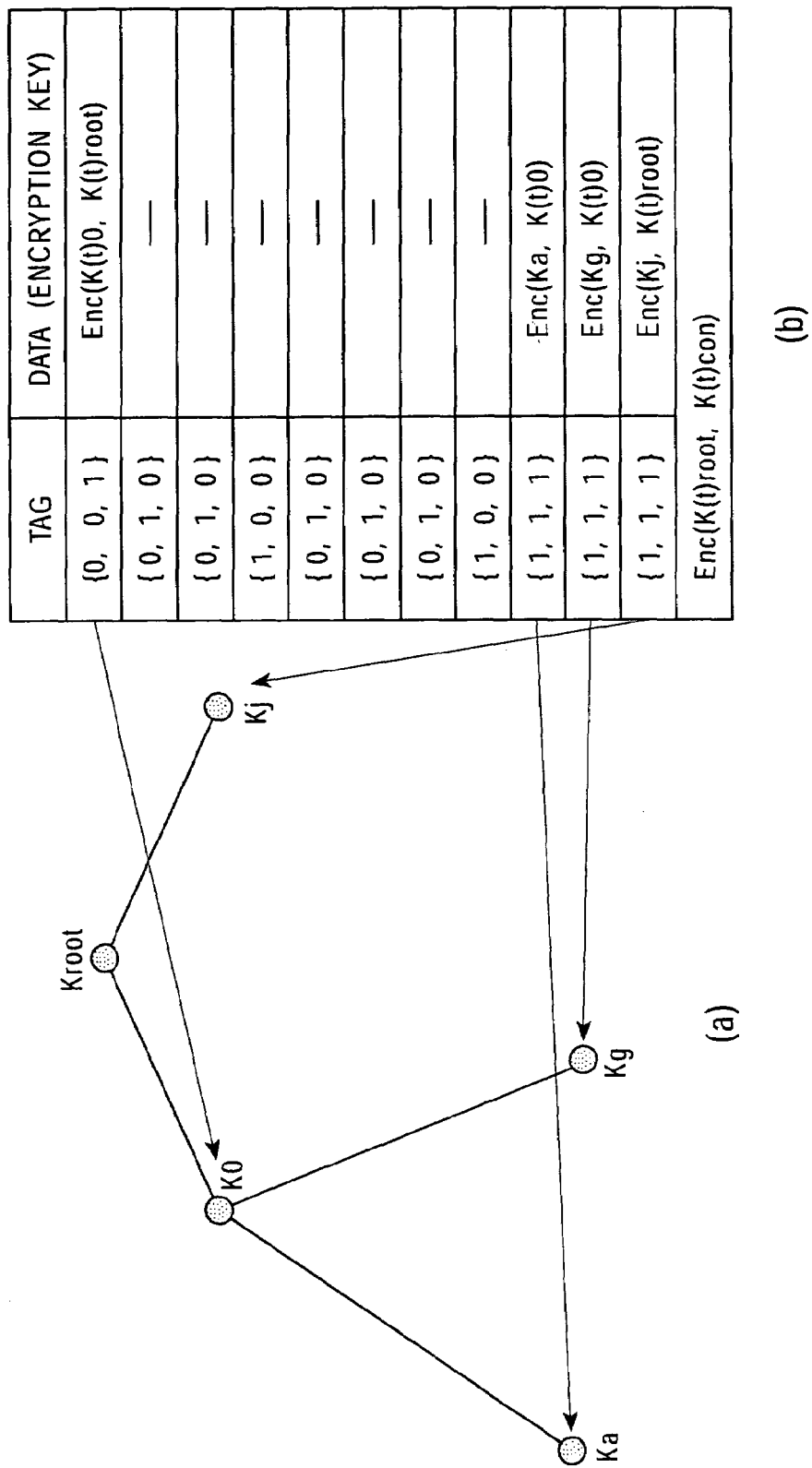
FIG. 14 is a diagram showing a simplified enabling key block (EKB) used in the system according to the present invention.

A technique of reducing the data size of the enabling key block (EKB) is described below. FIG. 14 shows an example of an enabling key block (EKB) simplified depending on the devices to which keys are transmitted.

As in the example shown in FIG. 13, it is also assumed that a key such as a content key is transmitted to devices a, g, and j at corresponding leaves. As shown in FIG. 14(a), a tree structure is produced such that it includes only those devices to which the key is to be transmitted. In this case, the tree structure shown in FIG. 14(b) is produced on the basis of the tree structure shown in FIG. 12(b). In a path from Kroot to Kj, there is no path branching from the path from Kroot to Kj, and thus this path can be represented by only one branch. On the other hand, to reach Ka or Kg from Kroot, it is needed to branch at K0 to Ka or Kg. Thus, the tree can be formed so as to have two branches as shown in FIG. 14(a).

As shown in FIG. 14(a), the resultant tree has a simplified form including only one node K0. The enabling key block (EKB) used to distribute renewed keys is produced on the basis of this simplified tree. The tree shown in FIG. 14(a) can be produced by reconstructing the original tree such that a binary tree is first produced such that it includes only paths to endpoint nodes or leaves that are allowed to decrypt the enabling key block (EKB) and then unnecessary nodes are removed from the tree. The enabling key block (EKB) used to distribute renewed keys is produced on the basis of only keys corresponding to the nodes or leaves included in this reconstructed hierarchical tree.

The enabling key block (EKB) described above with reference to FIG. 13 includes all encrypted keys existing in paths from respective leaves a, g, and j to Kroot. In contrast, the simplified EKB includes only encrypted keys at nodes included in the simplified tree. As shown in FIG. 14(b), each tag is represented by 3 bits. The second and third bits are used in the same manner as in the example shown in FIG. 13. That is, the second bit has a value of 0 or 1 depending on whether there is data in the L (left) direction, and the third bit has a value of 0 or 1 depending on whether there is data in the R (right) direction. The third bit is used to indicate whether the EKB includes an encrypted key at the node corresponding to the tag. When an encrypted key is included, the first bit is set to 1, while it is set to 0 if no encrypted key is included.

The data size of the enabling key block (EKB), which is provided to devices (leaves) via a data communication network or provided by supplying a storage medium on which the EKB is stored, can be greatly reduced by employing the structure shown in FIG. 14(b) compared with the structure shown in FIG. 13. When each device receives the enabling key block (EKB) shown in FIG. 14, the device sequentially decrypts only the data at locations where the third bit of the corresponding tags is 1, thereby obtaining all necessary decrypted keys. More specifically, the device a decrypts encrypted data Enc(Ka, K(t)0) using a leaf key Ka thereby acquiring a node key K(t)0, and decrypts encrypted data Enc(K(t)0, K(t)root) using the node key K(t)0 thereby acquiring K(t)root. On the other hand, the device j decrypts encrypted data Enc(Kj, K(t)root) using a leaf key Kj thereby acquiring K(t)root.

As descried above, if a new simplified tree structure including only devices to which data is to be transmitted is produced, and if an enabling key block (EKB) is produced using only leaf keys and node keys included in the simplified tree, the resultant enabling key block (EKB) becomes small in data size, and thus it becomes possible to transmit the enabling key block (EKB) in an efficient manner.

The simplified hierarchical tree structure is useful in particular when enabling key blocks (EKBs) are managed on the basis of entities as will be descried later. The entity is a set of nodes or leaves selected from nodes or leaves of an original key distribution tree. An entity may be formed in various aspects. For example, an entity may be a set of nodes or leaves that are combined together in accordance with the device type, the device supplier, the content provider, or the settlement institution, or in accordance with a common feature in terms of process, management, or services provided. Devices classified into one category may be members of an entity. For example, if constructing a simplified tree including top nodes (subroots) of a plurality of entities in a similar manner as described above, and if an EKB is produced on the basis of the constructed tree, then the resultant simplified enabling key block (EKB) can be decrypted only by devices belonging to any one of the selected entities. The management on the basis of the entities will be described in detail later.

The enabling key block (EKB) may be stored on an information storage medium such as an optical disk or a DVD. For example, an enabling key block (EKB) including a data part including encrypted key data and a tag part including location identification data identifying the locations of the encrypted key data in a hierarchical tree structure may be stored together with message data such as content data encrypted using a renewed node key on an information storage medium, and the resultant information storage medium may be provided to devices. Each device can sequentially extract encrypted key data included in the enabling key block (EKB) in accordance with the identification data in the tag field, and can decrypt the extracted encrypted key data thereby acquiring a key needed to decrypt a content and thus using the content. Of course, the enabling key block (EKB) may be transmitted via a network such as the Internet.

[Recording and Playing Back of Data into or from a Removable Storage Medium]

In conjunction with the process using an enabling key block (EKB) on the basis of the hierarchical tree structure, a process of storing data into a removable storage medium (removable storage device) such as a memory card or a memory stick which can be removably attached to a PC, a portable telephone, or a playback apparatus for playing back a content is described below.

(Constructions of the Information Recording Apparatus and the Information Playback Apparatus)

Figure 15:
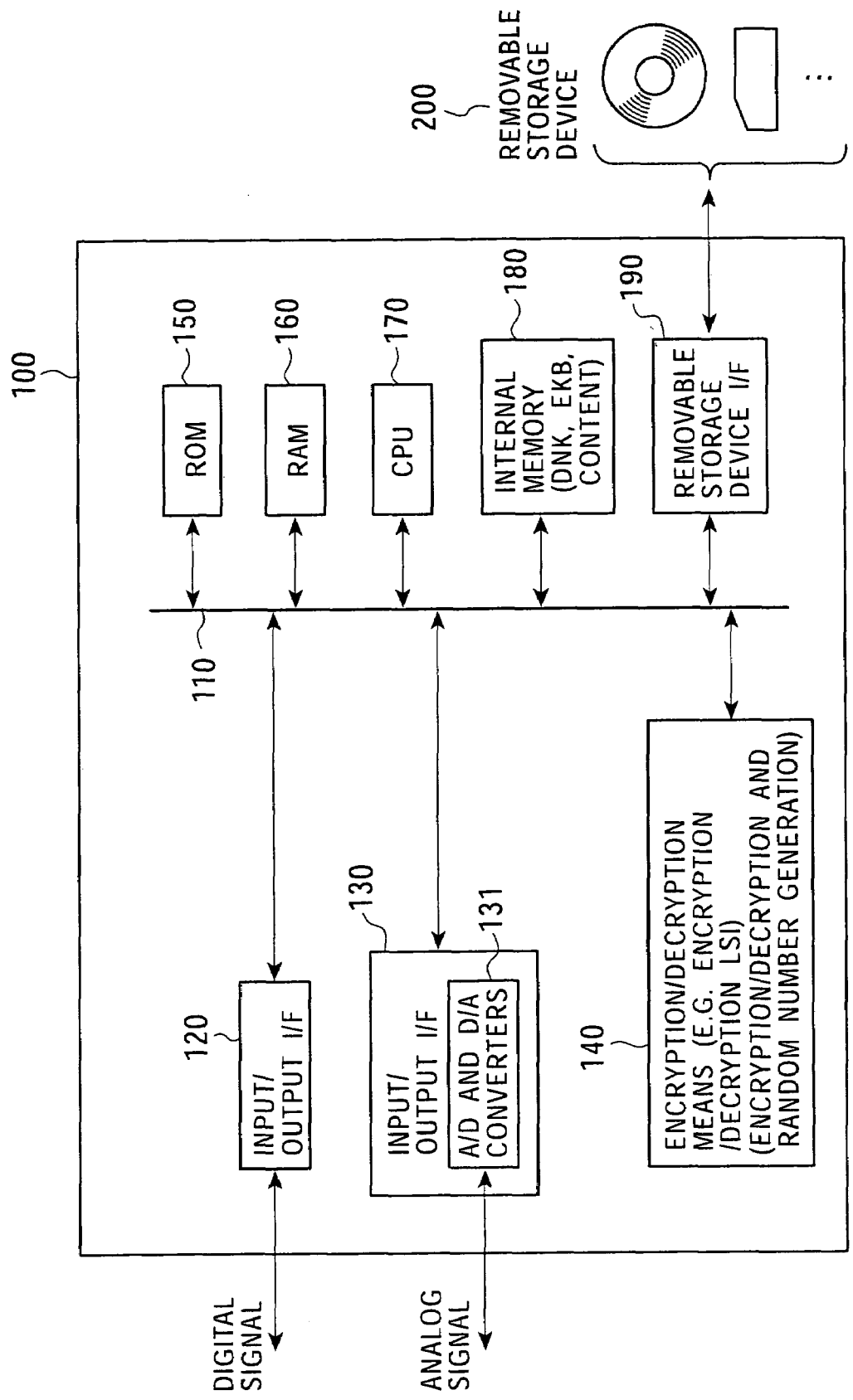
FIG. 15 is a diagram showing an example of a data playback apparatus in the system according to the present invention.

FIG. 15 is a block diagram showing an example of the construction of a data processing apparatus serving as an information recording apparatus for recording a content or serving as an information playback apparatus for playing back a content. Specific examples of such apparatuses include a PC, a portable telephone, and data playback apparatus, to which a removable storage device such as a memory card serving as a storage medium can be removably attached.

A data processing apparatus 100 includes an input/output Interface 120 for inputting and outputting a digital signal, an input/output Interface 130 including A/D and D/A converters 131 for inputting and outputting an analog signal, cryptographic means 140, a ROM (Read Only Memory) 150, a RAM (Random Access Memory) 160, a CPU (Central Processing Unit) 170, an internal memory 180, and a drive 190 for driving a removable storage device 200, wherein those devices are connected to each other via a bus 110.

The input/output interface 120 receives a digital signal representing a content such as video data, audio data, or a program provided from the outside and outputs the received digital signal over the bus 110. The input/output interface 120 also receives a digital signal via the bus 110 and outputs the received digital signal to the outside. The input/output interface 130 includes the A/D and D/A converter 131. The input/output interface 130 receives a content in the form of an analog signal from the outside and converts it into digital form using the A/D and D/A converters 131. The resultant digital signal is output over the bus 110. Conversely, if the input/output interface 130 receives a digital signal via the bus 110, the digital signal is converted into analog form using the A/D and D/A converters 131, and the resultant analog signal is output to the outside.

The cryptographic means 140 is formed, for example, by a one-chip LSI (Large Scale Integrated Circuit) so as to perform various cryptographic processes including encryption/decryption of a digital content signal supplied via the bus 110 and outputting of the resultant encrypted signal over the bus 110, generation of a random number, and generation of an encryption key on the basis of the random number. The cryptographic means 150 may be realized not only using a one-chip LSI but may also be realized by software or a combination of software and hardware, wherein the software may be executed by the CPU 170.

The ROM 150 stores a program executed by the CPU 170 and also stores data indicating fixed parameters used in computational operations. The RAM (Random Access Memory) 160 is used as a storage area or a working area, for storing a program executed by the CPU 170 and varying parameters used in the execution of the program. The CPU 170 controls the encryption/decryption processing performed by the cryptographic means 150 and various processes in recording or playing back data by executing a program stored in the ROM 150 or the internal memory 180.

The storage device interface 190 controls inputting and outputting of data to or from the removable storage device 200 capable of recording and reading digital data so as to read (play back) data from the removable storage device 200 and output the data over the bus 110 or so as to supply data acquired via the bus 110 to the removable storage device 200 and record the data into the removable storage device 200.

This data processing apparatus corresponds to one of leaves of the tree structure described above with reference to FIG. 3 and has an internal memory 180 in which a device node key (DNK) set including leaf keys and node keys. For example, in a case in which the data processing apparatus corresponds to the device 0, the leaf key K0000 and the node keys K000, K00, K0, and Kroot are stored as the device node key (DNK) set in the internal memory 180. The internal memory 180 may also be used as a storage area for storing a content input from the outside via the input/output IF 120 or 140 or via the storage device interface. Furthermore, the internal memory 180 may also be used as a storage area for storing the enabling key block (EKB).

If the data processing apparatus shown in FIG. 15 purchases a content in an authorized manner via a network, a telephone line, or a content distribution terminal, the data processing apparatus stores the purchased content into the internal memory 180 and plays back the content by reading it from the internal memory 180. If a content encrypted using a content key Kcon which can be acquired by processing an enabling key block (EKB) is provided from the outside, the encrypted content can be decrypted using the content key acquired by decrypting the enabling key block (EKB) using the device node key (DNK) set stored in the data processing apparatus as described earlier with reference to FIG. 9, and thus the content can be played back.

A process performed by such a data processing apparatus capable of playing back a content to output a content acquired from the outside and stored in the internal memory into a removable storage device such as a memory card is described below.

(Content Storage Process)

Figure 16:
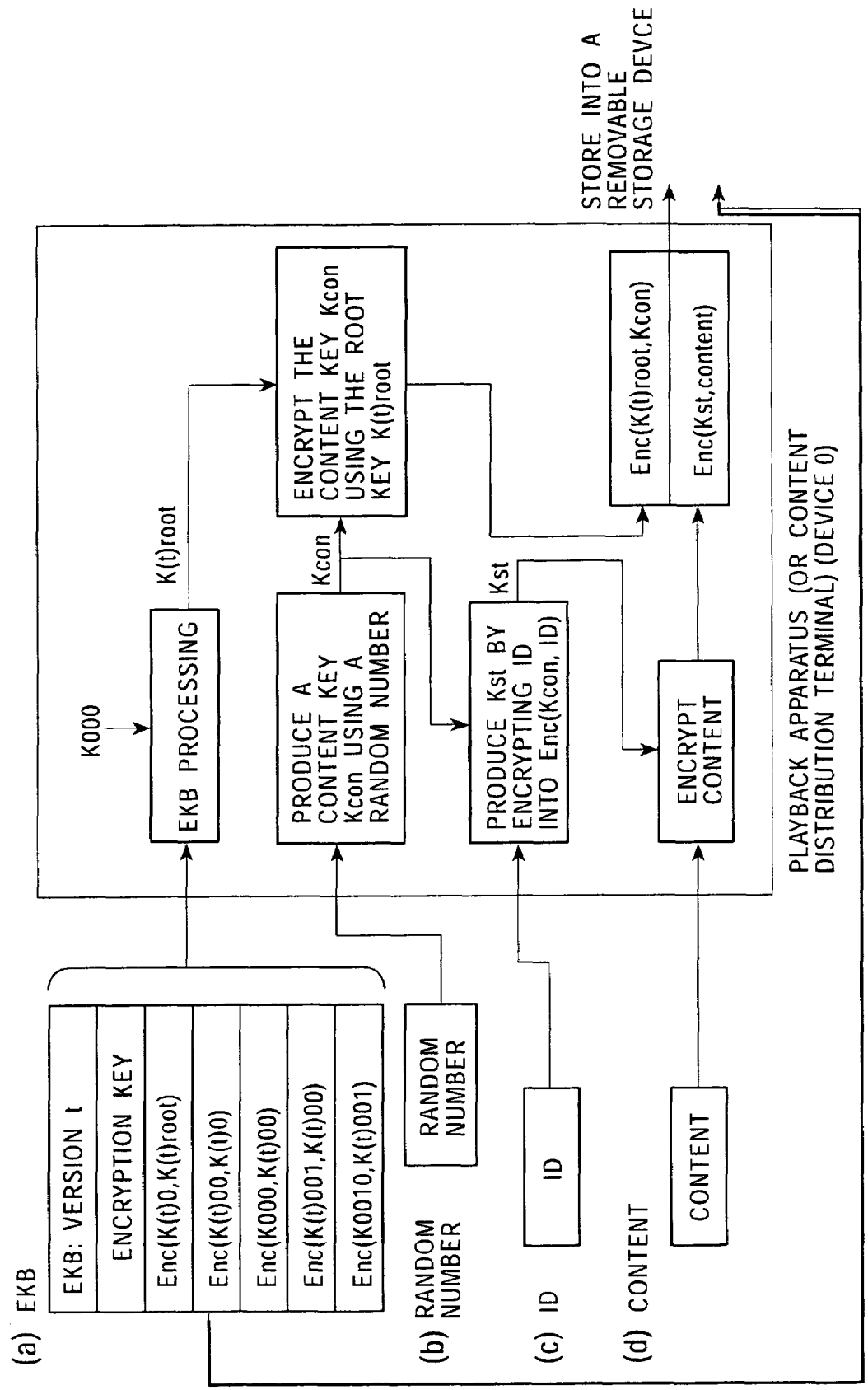
FIG. 16 is a diagram showing an example of a process of storing data into a removable storage medium, in the system according to the present invention.

FIG. 16 shows a process performed by the data processing apparatus to store a content into a removable storage medium. In the example shown in FIG. 16, the data processing apparatus corresponds to the device 0 in the tree structure shown in FIG. 3.

First, the data processing apparatus selects an EKB corresponding to a content to be stored into a removable storage device serving as a data storage medium, and then extracts the root key, which is one of keys included in the hierarchical tree structure, from the EKB by decrypting the EKB using a device node key (DNK) of the data processing apparatus. More specifically, in the example shown in FIG. 16, the EKB corresponding to the content to be stored into the removable storage device is an EKB of version t, and thus the data processing apparatus reads the EKB of the version t from the internal memory and decrypts the EKB using the device node key, that is, K0000 in this specific example, thereby extracting the root key K(t)root.

Thereafter, the data processing apparatus generates a random number and produces a content key Kcon on the basis of the random number. Note that a random number is generated each time a content is stored into a removable storage device such that a different content key is produced each time the content storage process is performed. Herein, the purpose of producing the content key is to make it possible to store a content acquired via the network or from the content distribution terminal into a removable storage medium even if the content is not encrypted using a content key. Therefore, in a case in which the content acquired from the outside has already been encrypted using a content key which can be acquired from the outside, the content key acquired from the outside may be used without performing the above process of producing the content key on the basis of a random number. Of course, even in such a case, the content key may be produced by the data processing apparatus on the basis of the random number.

Thereafter, the content key produced on the basis of the random number is encrypted using the root key K(t)root acquired by decrypting the EKB in the previous step, thereby producing encrypted data Enc(K(t)root, Kcon), that is, the content key encrypted with the root key.

Furthermore, the ID of the data processing apparatus is encrypted using the content key Kcon produced in the above process, thereby producing a storage key Kst=Enc(Kcon, ID). In this process, in a case in which the data processing apparatus is a portable telephone, a telephone number of the portable telephone may be employed as the ID of the data processing apparatus.

Thereafter, the content (DATA) is encrypted using the storage key Kst produced by encrypting the ID using the content key Kcon, thereby producing an encrypted content Enc(Kst, DATA).

The encrypted data Enc(K(t)root, Kcon) produced by encrypting the content key Kcon using the root key K(t)root and the encrypted data Enc(Kst, DATA).produced by encrypting the content (DATA) using the storage key Kst are stored as a data file into the removable storage medium.

More specifically, the data processing apparatus stores the data file including the encrypted content together with the corresponding EKB file into the removable storage device. When the EKB file and the data file are stored, they are related to each other. For example, version information associated with the EKB is added to the data file so as to indicate the relationship between the data file and the EKB file. As described earlier with reference to FIG. 6, the EKB file includes version information.

Figure 17:
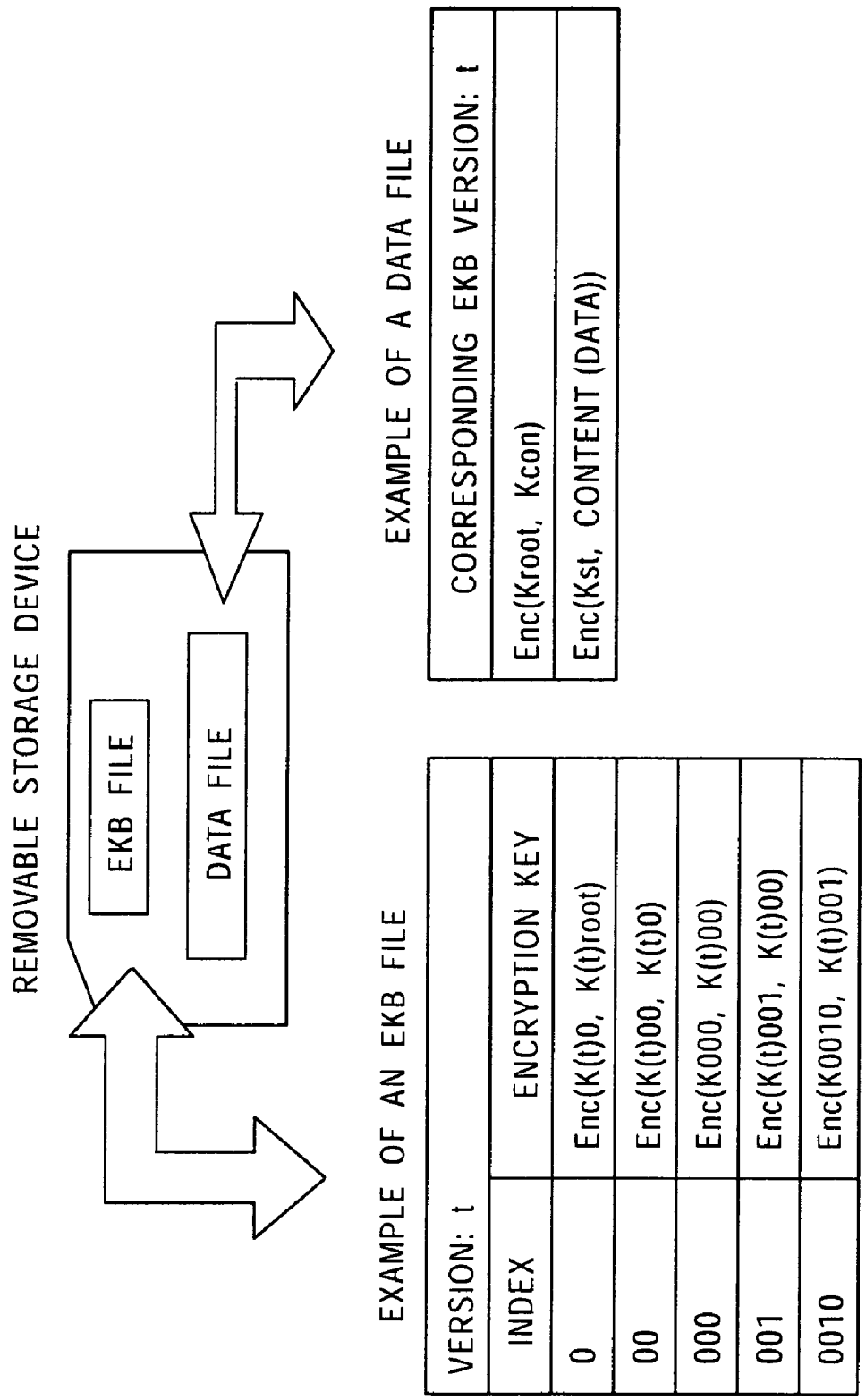
FIG. 17 is a diagram showing an example of data stored in a removable storage medium, in the system according to the present invention.

FIG. 17 shows an example of an EKB file and an example of a data file, which are stored in a removable storage device. The EKB file is formed such that the root key K(t)root, which is a member of the hierarchical tree structure, can be extracted using the device node key (DNK) set which has been distributed in advance to the data processing apparatus. The data file includes, as described earlier with reference to FIG. 16, the encrypted data Enc(K(t)root, Kcon) produced by encrypting the content key Kcon using the root key K(t)root, the encrypted data Enc(Kst, DATA) produced by encrypting the content (DATA) using the storage key Kst, and the version information associated with the EKB. In this specific example shown in FIG. 17, the version information indicates that the version of the EKB is t. In some cases, a plurality of contents are stored into a removable storage device. In such a case, EKB files corresponding to the respective contents are also stored.

(Process of Playing Back Data)

A process of playing back such an encrypted content (DATA) stored in a removable storage device (storage medium) is described below with reference to FIG. 18.

Figure 18:
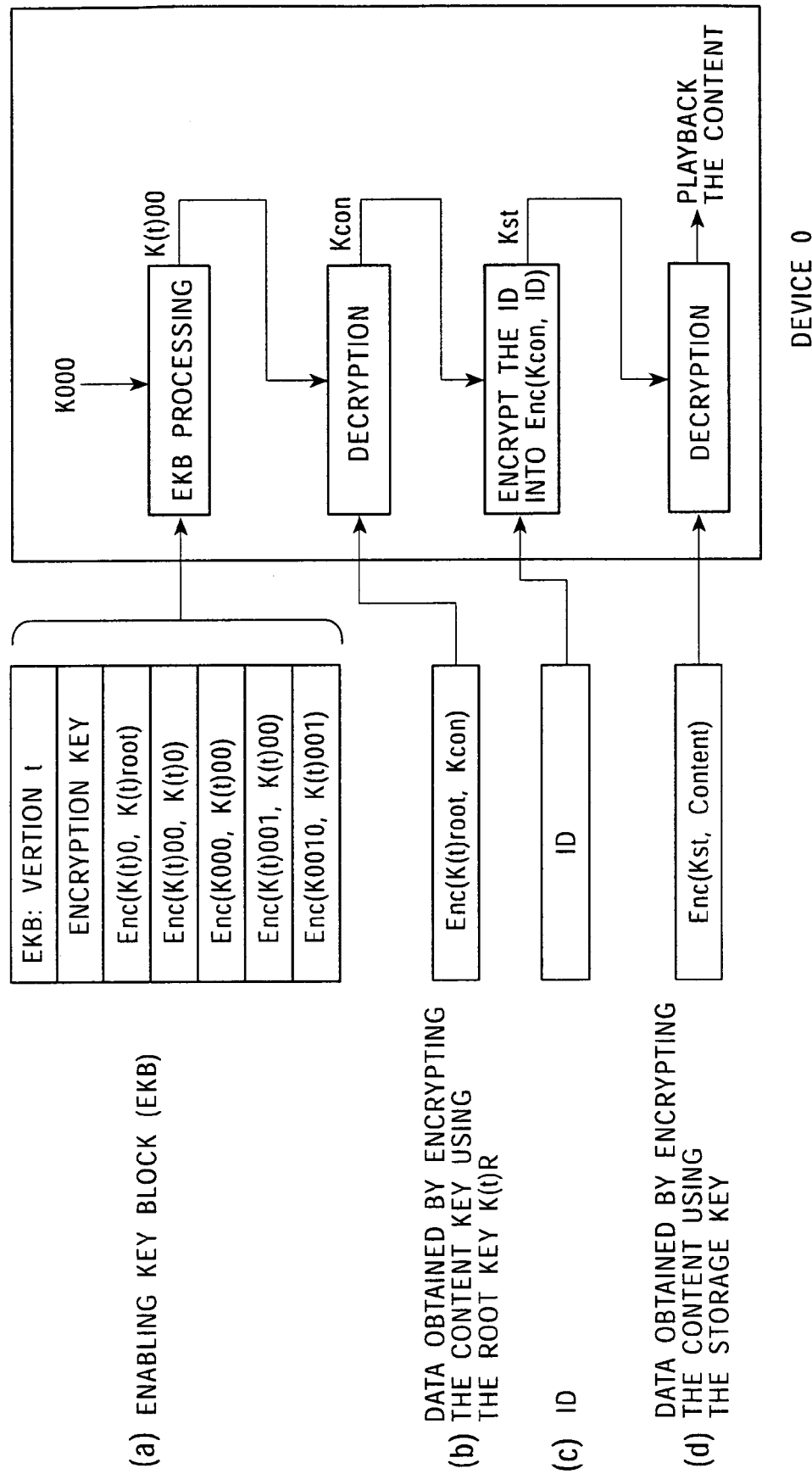
FIG. 18 is a diagram showing an example of a process of playing back data stored in a removable storage medium, in the system according to the present invention.

In the example shown in FIG. 18, a content is played back in a normal manner by a data processing apparatus (device 0) which is an authorized content purchaser and which has stored the content into the removable storage apparatus.

First, the data processing apparatus extracts version information associated with the corresponding EKB from the data file stored in the removable storage device and reads an EKB file corresponding to the version (t in this specific example) indicated by the extracted version information from the removable storage device. The data processing apparatus then decrypts the EKB using a device node key (DNK) set stored in the data processing apparatus thereby obtaining a root key K(t)root which is one of keys in the hierarchical tree structure. Note that the EKB can be successfully decrypted only by devices having a device node key (DNK) set necessary to decrypt the EKB.

Thereafter, the data processing apparatus reads encrypted data Enc(K(t)root, Kcon), produced by encrypting a content key Kcon using the root key K(t)root, from the removable storage device and decrypts the encrypted data Enc(K(t)root, Kcon) using the root key K(t)root extracted by decrypting th EKB, thereby acquiring the content key Kcon.

The data processing apparatus then encrypts the ID thereof, such as a telephone number in the case in which the data processing apparatus is a portable telephone or a device number or the like in the case in which the data processing apparatus is a playback apparatus, by applying the acquired content key Kcon, thereby obtaining Enc(Kcon, ID) and thus producing a storage key Kst. Because the storage key Kst is produced on the basis of the ID of each data processing apparatus, the resultant storage key Kst becomes different from an data processing apparatus to another. That is, if another apparatus having a different ID produces a storage key, the resultant storage key becomes different from that described above.

The data processing apparatus then reads encrypted data Enc(Kst, DATA), produced by encrypting the content (DATA) using the storage key Kst, from the data file stored in the removable storage device and decrypts the encrypted data Enc(Kst, DATA) using the produced storage key Kst. In order to perform the decryption successfully, it is required that the storage key Kst produced herein should be identical to that which was used to encrypt the content stored when the content was stored into the removable storage device. In the example shown in FIG. 18, the data processing apparatus is the same device as the device 0 which has stored the content into the removable storage device. As a result, the ID becomes identical to that of the device which has stored the content into the removable storage device, and the storage key produced herein becomes identical to that used in storing the data. Thus, the decryption of the encrypted content Enk(Kst, DATA) is successfully performed and it becomes possible to play back the content.

In a case in which an apparatus different from that which has stored the content into the removable storage device attempts to play back the data, the difference in the ID causes the produced storage key to become different from that used in the process of storing the data, and thus it is impossible to successfully decrypt the encrypted content Enk(Kst, DATA) and thus it is impossible to play back the content.

In the present invention, as described above, a content stored in a removable storage device can be played back by an apparatus if and only if the apparatus is capable of extracting a content key by decrypting an EKB and the apparatus is the same as that which has stored the content into the removable storage. This means that even in a case in which there are plural devices belonging to a specific group in the hierarchical tree structure shown in FIG. 3 and being capable of decrypting the same EKB, the apparatus allowed to play back a content from a removable storage device can be limited only to the apparatus which has stored the content into the removable storage device.

(Process of Downloading a Content from a Content Distribution Terminal)

In the above-described process of storing a content, it is assumed that the storing of the content is performed by transferring the content stored in the internal memory of the data processing apparatus into the removable storage device. Instead, a content may be stored into a removable storage device by purchasing the content from a service provider and downloading the purchased content from a content distribution terminal installed at a station or a shop into a removable storage device attached to the content distribution terminal. Such a content can also be played back by the data processing apparatus (such as a PC, a portable telephone, or a playback apparatus) of the user who has purchased the content, by attaching the removable storage device to the data processing apparatus.

Figure 19:
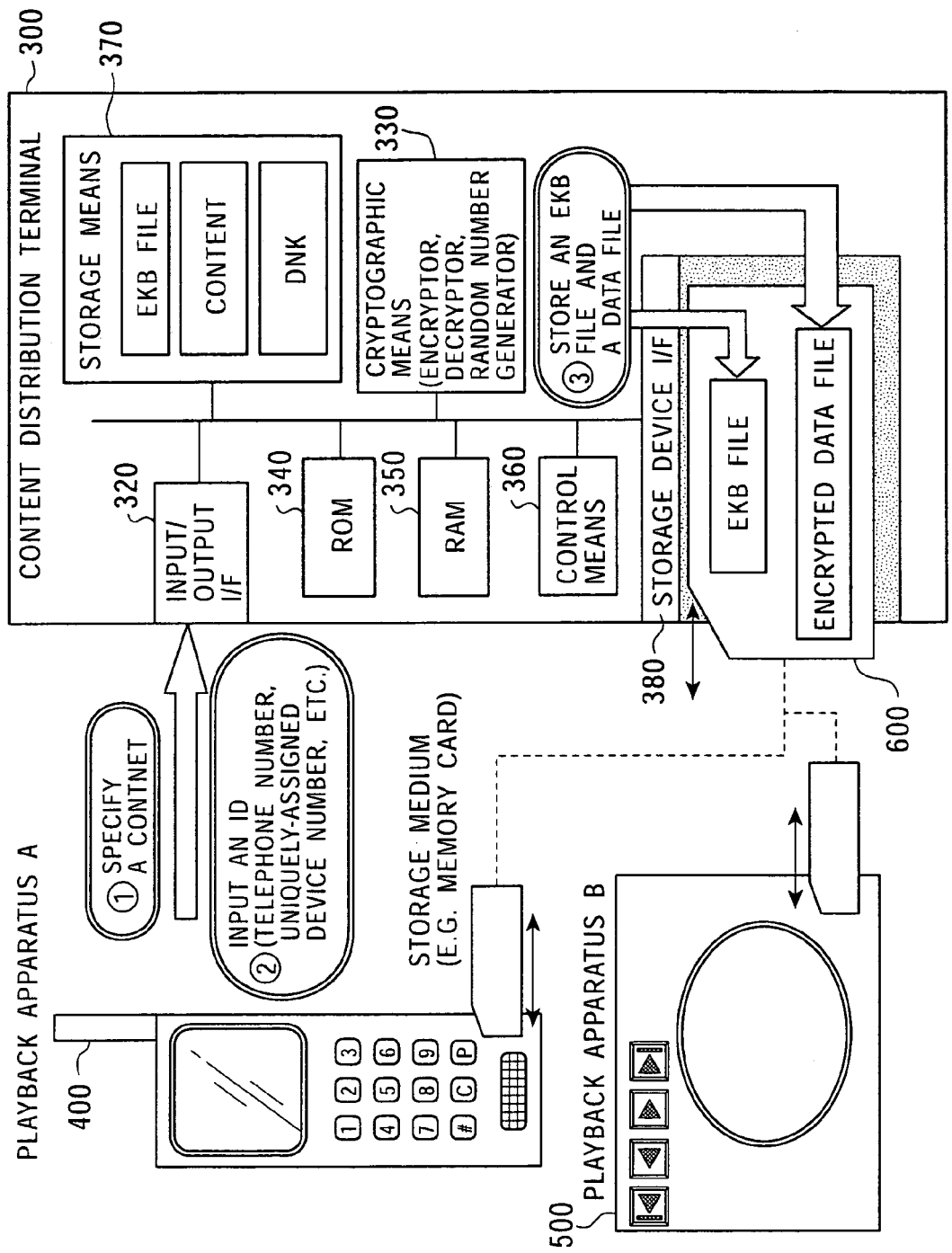
FIG. 19 is a diagram showing an example of a process of storing data into a removable storage medium from a content distribution terminal, in the system according to the present invention.

Referring to FIG. 19, a process of attaching a removable storage device serving as a storage medium to a content distribution terminal and purchasing a content is described below.

FIG. 19 shows a content distribution terminal 300, installed at a station, shop, or the like, for supplying a content provided by a serving provider, a playback apparatus A (400) in the form of a portable telephone serving as a data processing apparatus for playing back a content purchased from the content distribution terminal 300, and a playback apparatus B (500). Purchasing a content is performed by first attaching a removable storage device 600 such as a memory card of the playback apparatus A (400) or the playback apparatus B (500) to the content distribution terminal 300, and then selecting a desired content and downloading the selected content into the removable storage device 600.

The construction of the content distribution terminal 300 is described below. The content distribution terminal includes storage means 370 storing device node key (DNK) sets for use by data processing apparatus (devices) corresponding to respective leaves of a tree structure such as that described earlier with reference to FIG. 3. The content distribution terminal is constructed such that a removable storage device 600 such as a memory card can be removably attached thereto.

The content distribution terminal 300 includes an input/output interface 320 for inputting and outputting data, cryptographic means 330, a ROM (Read Only Memory) 340, a RAM (Random Access Memory) 350, a CPU (Central Processing Unit) 360, the storage means 370, and a removable storage device interface 380, which are connected to each other via a bus.

The input/output interface 320 displays information about downloadable contents and prices thereof. The input/output interface 320 also performs processing associated with inputting of data performed by a user when the user purchases a content. The cryptographic means 330 is formed of, for example, a one-chip LSI (Large Scale Integrated Circuit) so as to serve to perform various processes associated with cryptographic processing such as encryption or decryption of a content in the form of a digital signal supplied via the bus and outputting of the resultant encrypted or decrypted data over the bus. The cryptographic means 330 may be realized not only using a one-chip LSI but may also be realized by software or a combination of software and hardware, wherein the software may be executed by the control means (CPU) 360.

The ROM 340 stores a program executed by control means (CPU) 360 and also stores data indicating fixed parameters used in computational operations. The RAM (Random Access Memory) 350 is used as a storage area or a working area, for storing a program executed by the control means (CPU) 360 and varying parameters used in the execution of the program. The control means (CPU) 360 controls the encryption/decryption processing performed by the cryptographic means 330 and various processes associated with downloading of data, in accordance with the program stored in the ROM 340 or the storage means 370.

The storage device interface 380 controls inputting and outputting of data to and from the removable storage device 200. This content distribution terminal 300 corresponds to one of leaves of the tree structure described above with reference to FIG. 3, and a device node key (DNK) set including a leaf key and node keys is stored in the storage means 370. For example, the content distribution terminal 300 corresponds to the device 0, a device node key (DNK) set including a leaf key K0000 and node keys K000, K00, K0, and Kroot is stored in the storage means 370. The storage means 370 is also used as a storage area for storing contents and as a storage area for storing enabling key blocks (EKB).

A process of attaching the removable storage device 600 to the content distribution terminal 300 shown in FIG. 19 and purchasing a content is described below.

For example, when a user wants to purchase a content to be played back using the playback apparatus A (400), the user first attaches the removable storage device 600, to which the content is to be downloaded, to the content distribution terminal 300.

Thereafter, the content-purchasing user specifies a content via the input/output interface 320 and inputs the ID of the playback apparatus A (400), such as a telephone number or identification data uniquely assigned to the apparatus.

The content distribution terminal 300 stores an EKB file and a data file into the removable storage device as shown in FIG. 17 by performing a process similar to that described earlier with reference to FIG. 16. Referring again to FIG. 16, the process of storing data into the removable storage device 600 attached to the content distribution terminal 300 is described below.

In the following description, it is assumed that the content distribution terminal 300 corresponds to the device 0 in the tree structure shown in FIG. 3. The playback apparatus A (400) also corresponds to one of leaves in the tree structure shown in FIG. 3, and a device node key (DNK) set is stored in the playback apparatus A (400).

First, the content distribution terminal 300 selects an EKB corresponding to the content specified by the user via the input/output interface 320, and then extracts the root key, which is one of keys included in the hierarchical tree structure, from the EKB by decrypting the EKB using the device node key (DNK) set of the content distribution terminal 300. In the example shown in FIG. 16, the EKB corresponding to the content to be stored into the removable storage device is an EKB of version t, and thus the content distribution terminal 300 reads the EKB of the version t from the storage means 370 and decrypts the EKB using the device node key, that is, K0000 in this specific example, thereby extracting the root key K(t)root.

Thereafter, in the content distribution terminal 300, the cryptographic means 330 generates a random number and produces a content key Kcon on the basis of the random number. Note that a random number is generated each time a content is stored into a removable storage device such that a different content key is produced each time the process of downloading a content into a removable storage device is performed. As described earlier, the purpose of producing the content key is to make it possible to store a content into a removable storage medium even if the content has not been encrypted using a content key. Therefore, in a case in which the content has already been encrypted using a content key which has already been acquired from the outside, the content key acquired from the outside may be used without performing the above process of producing the content key on the basis of a random number. Of course, even in such a case, the content key may be produced by the content distribution terminal 300 on the basis of the random number.

Thereafter, the content key produced on the basis of the random number is encrypted using the root key K(t)root acquired by decrypting the EKB in the previous step, thereby producing encrypted data Enc(K(t)root, Kcon), that is, the content key encrypted with the root key.

Furthermore, the ID, input by the user via the input/output interface 320, of the content-purchasing device, that is, the telephone number of the portable telephone serving as the playback apparatus A (400), is encrypted using the content key Kcon produced in the above process, thereby producing a storage key Kst=Enc(Kcon, ID).

Thereafter, the content (DATA) is encrypted using the storage key Kst produced by encrypting the ID using the content key Kcon, thereby producing an encrypted content Enc(Kst, DATA).

The encrypted data Enc(K(t)root, Kcon) produced by encrypting the content key. Kcon using the root key K(t)root and the encrypted data Enc(Kst, DATA) produced by encrypting the content (DATA) using the storage key Kst ate stored as a data file into the removable storage medium.

More specifically, the content distribution terminal 300 stores the data file including the encrypted content together with the corresponding EKB file into the removable storage device. When the EKB file and the data file ate stored, they are related to each other. For example, version information associated with the EKB is added to the data file so as to indicate the relationship between the data file and the EKB file. As described earlier with reference to FIG. 6, the EKB file includes version information.

As described above, the content distribution terminal 300 produces the storage key Kst on the basis of the ID input from the outside and encrypts the content using the produced storage key Kst. The EKB file and the data file stored in the removable storage device have formats similar to those described earlier with reference to FIG. 17, and the EKB file and the data file are stored in such a manner that they are related to each other.

The encrypted content (DATA) stored from the content distribution terminal 300 into the removable storage device 600 can be played back in a similar manner as described earlier with reference to FIG. 18.

However, in the present process, unlike the process shown in FIG. 18 in which the playback process is performed by the device 0 belonging to the tree structure shown in FIG. 3, the playback apparatus A (400) is different from the device 0 corresponding to the content distribution terminal 300 but the playback apparatus A (400) corresponds to another device, for example, device 1. In this case, version information associated with the corresponding EKB is extracted from the data file stored in the removable storage device and then an EKB file corresponding to the version (t in this specific example) indicated by the extracted version information is read from the removable storage device. The EKB is decrypted using a device node key (DNK) set stored in the playback apparatus A (400) thereby acquiring a root key K(t). Note that the EKB can be successfully decrypted only by devices having a device node key (DNK) set necessary to decrypt the EKB.

Thereafter, the playback apparatus A (400) reads encrypted data Enc(K(t)root, Kcon), produced by encrypting a content key Kcon using the root key K(t)root, from the removable storage device and decrypts the encrypted data Enc(K(t)root, Kcon) using the root key K(t)root extracted by decrypting th EKB, thereby acquiring the content key Kcon.

The playback apparatus A (400) then encrypts the its ID, that is, the telephone number using the acquired content key Kcon thereby producing a storage key Kst=Enc(Kcon, ID). The resultant storage key Kst becomes identical to that which was produced by the content distribution terminal 300 on the basis of the ID given by the user when the content was purchased.

The playback apparatus A (400) then reads encrypted data Enc(Kst, DATA), produced by encrypting the content (DATA) using the storage key Kst, from the data file stored in the removable storage device and decrypts the encrypted data Enc(Kst, DATA) using the produced storage key Kst. In order to perform the decryption successfully, it is required that the storage key Kst produced herein should be identical to that which was used to encrypt the content stored when the content was stored into the removable storage device. In this specific example, because the same telephone number of the playback apparatus A (400) is used as the ID both in the content storage process and the content playback process, the storage key produced herein becomes identical to that used in storing the data. Thus, the decryption of the encrypted content Enk(Kst, DATA) is successfully performed and it becomes possible to play back the content.

In a case in which it is attempted to play back the content using an apparatus different from that used to store the content into the removable storage device, for example, in a case in which it is attempted to play back the content by attaching the removable storage device 600 to the playback apparatus B (500), a storage key is produced by the playback apparatus B (500) on the basis of an ID (such as a device number) different from the ID employed in the content storage process, and thus the resultant storage key becomes different from the storage key used by the content distribution terminal 300 to encrypt the content stored in the removable storage device 600. This makes it impossible to successfully decrypt the encrypted content and thus it is impossible to playback the content.

In the present invention, as described above, a content stored into a removable storage device from an external content distribution terminal can be played back by an apparatus if and only if the apparatus is capable of extracting a content key by decrypting an EKB and the apparatus is the same apparatus which was specified when the content was purchased. This means that even in a case in which there are plural devices belonging to a specific group in the hierarchical tree structure shown in FIG. 3 and being capable of decrypting the same EKB, the apparatus allowed to play back a content from a removable storage device can be limited only to the apparatus which was specified when the content was purchased.

(Content Recording/Playing Back Sequence)

The process of storing a content into a removable storage device and the process of playing back the content stored in the removable storage device are described with reference to a flow chart.

Figure 20:
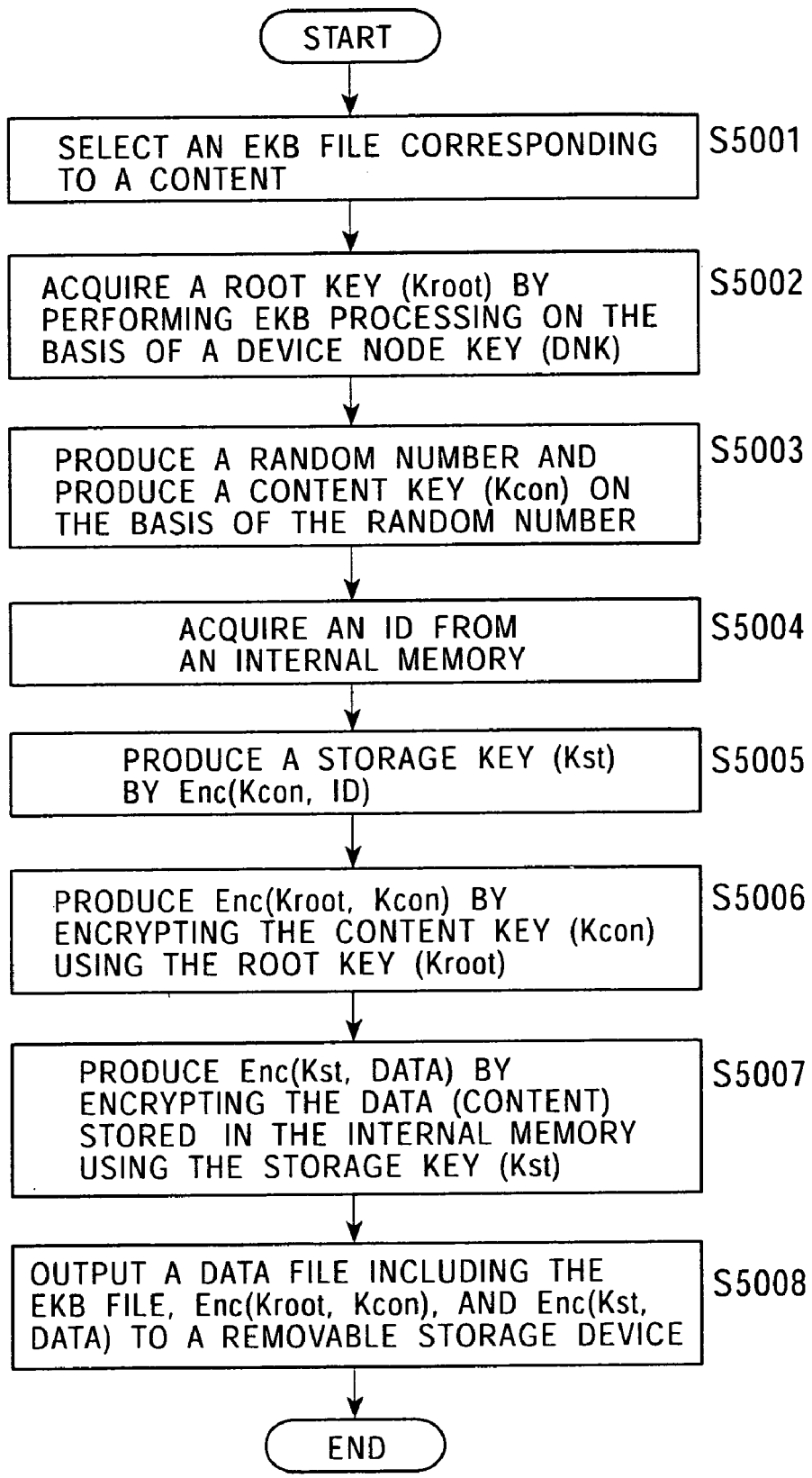
FIG. 20 is a flow chart showing a process of storing data into a removable storage medium, in the system according to the present invention.

First, referring to a flow chart shown in FIG. 20, the process performed by a data processing apparatus to store a content into a removable storage device removably attached to the data processing apparatus by transferring the content from an internal memory into the removable storage device is described below.

First, in step S5001, an EKB file to be applied to the content to be stored into the removable storage device is selected. Basically, the data processing apparatus needs to have only an EKB file of a newest version. However, in a case in which a plurality of EKB files are stored in the data processing apparatus, the EKB file of the newest version is selected from the plurality of EKB files.

In the next step S5002, a root key Kroot, which is one of keys included in the hierarchical tree structure by decrypting the EKB using a device node key (DNK) set including a leaf key and node keys stored in the data processing apparatus.

In step S5003, a random number is generated and a content key Kcon is produced on the basis of the random number. Herein, the purpose of producing the content key is to make it possible to store a content acquired via the network or from the content distribution terminal into a removable storage medium even if the content is not encrypted using a content key. Therefore, in a case in which the content acquired from the outside has already been encrypted using a content key which can be acquired from the outside, the content key acquired from the outside may be used without performing the above process of producing the content key on the basis of a random number. Of course, even in such a case, the content key may be produced by the data processing apparatus on the basis of the random number.

In step S5004, an ID is read from an internal memory. A storage key Kst is then produced by encrypting the ID with the content key Kcon according to Enc(Kcon, ID) using the cryptographic means (step S5005).

Thereafter, in step S5006, the content key Kcon is encrypted using the root key Kroot acquired by decrypting the EKB, thereby producing an encrypted content key Enc (Kroot, Kcon).

In the next step S5007, an encrypted content Enc(Kst, DATA) is produced by encrypting the content (DATA) to be stored into the removable storage device, using the storage key Kst. In step S5008, an EKB file and a data file including Enc(Kroot, Kcon) and Enc(Kroot, Kcon) are stored into the removable storage device in such a manner that they are related to each other.

Figure 21:
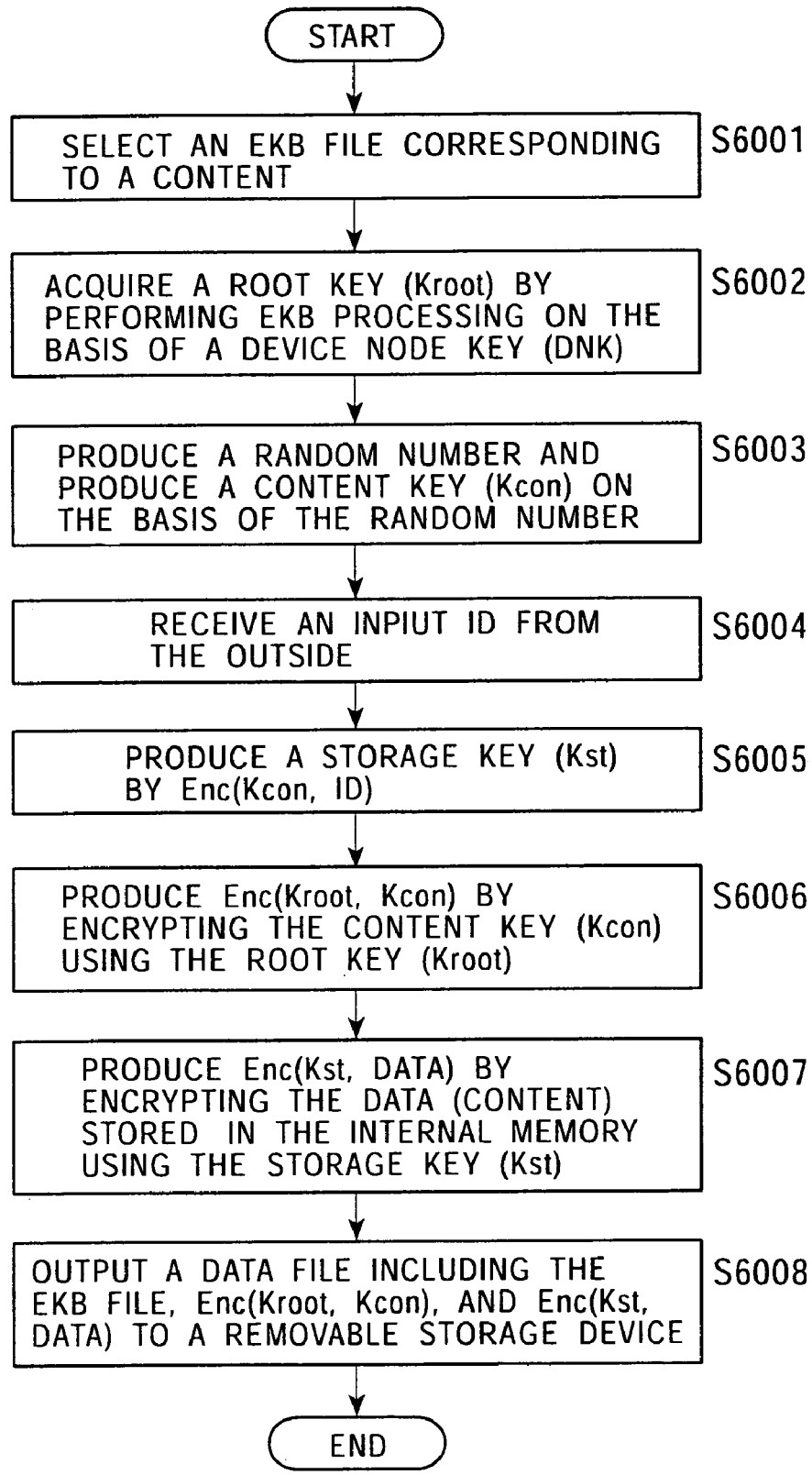
FIG. 21 is a flow chart showing a process of storing data into a removable storage medium from a content distribution terminal, in the system according to the present invention.

Now referring to a flow chart shown in FIG. 21, the process performed by the content distribution terminal to store a content into a removable storage device attached by a user is described.

First, in step S6001, an EKB file to be applied to a content specified by the user to be stored into the removable storage device attached by the user is selected. In the next step S6002, a root key Kroot, which is one of keys included in the hierarchical tree structure by decrypting the EKB using a device node key (DNK) set including a leaf key and node keys stored in the data processing apparatus.

In step S6003, a random number is generated and a content key Kcon is produced on the basis of the random number. As described earlier, the purpose of producing the content key is to make it possible to store a content into a removable storage medium even if the content has not been encrypted using a content key. Therefore, in a case in which the content has already been encrypted using a content key which has already been acquired from the outside, the content key acquired from the outside may be used without performing the above process of producing the content key on the basis of a random number. Of course, even in such a case, the content key may be produced by the content distribution terminal on the basis of the random number.

In step S6004, an ID input by the user from the outside is acquired. A storage key Kst is then produced by encrypting the ID with the content key Kcon according to Enc(Kcon, ID) using the cryptographic means (step S6005).

Thereafter, in step S6006, the content key Kcon is encrypted using the root key Kroot acquired by decrypting the EKB, thereby producing an encrypted content key Enc (Kroot, Kcon).

In the next step S6007, an encrypted content Enc(Kst, DATA) is produced by encrypting the content (DATA) to be stored into the removable storage device, using the storage key Kst. In step S6008, an EKB file and a data file including Enc(Kroot, Kcon) and Enc(Kroot, Kcon) are stored into the removable storage device in such a manner that they are related to each other.

Figure 22:
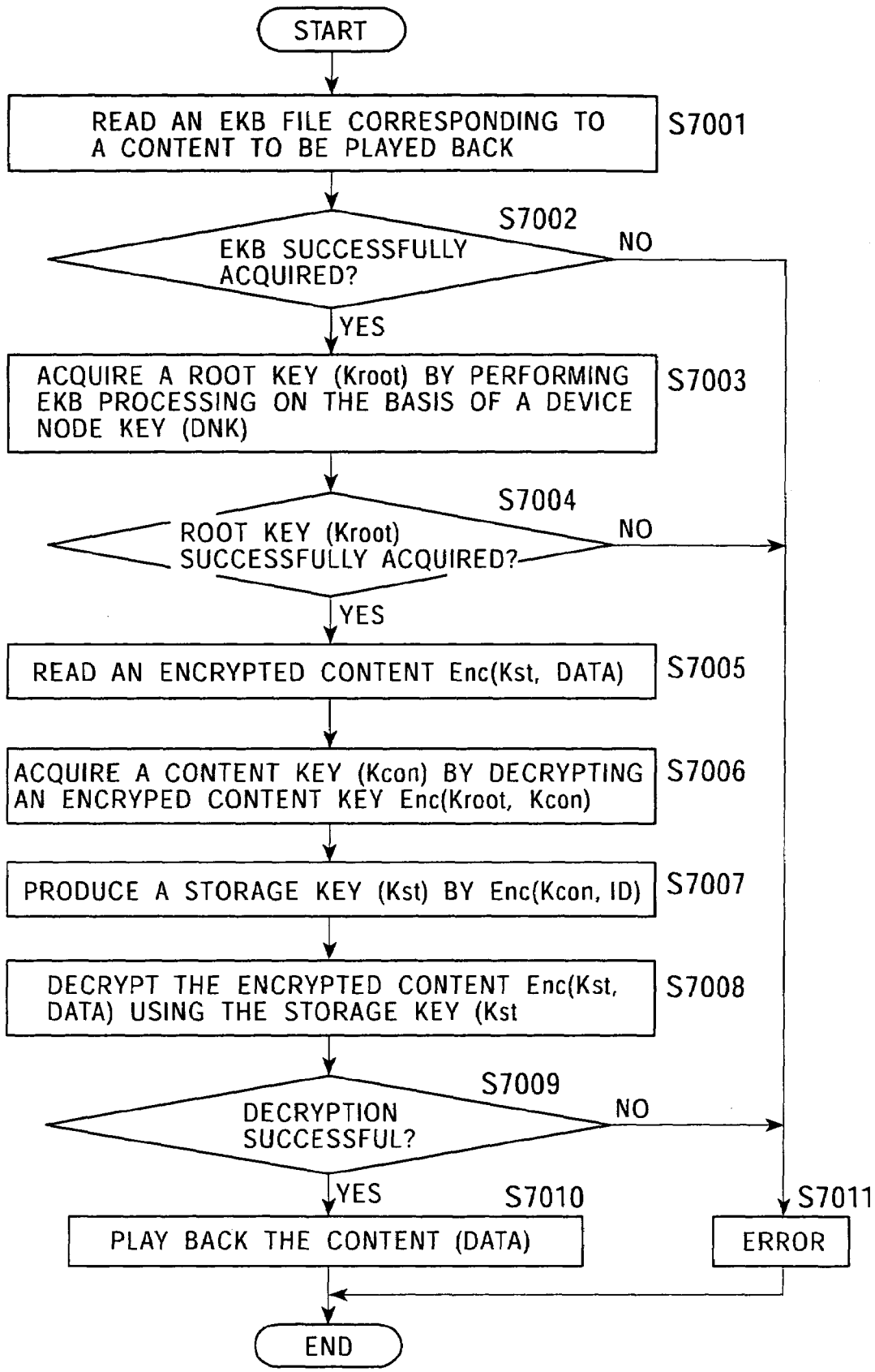
FIG. 22 is a flow chart showing a process of playing back data stored in a removable storage medium, in the system according to the present invention.

Referring to a flow chart shown in FIG. 22, the process performed by the data processing apparatus to play back a content stored in a removable storage device attached to the data processing apparatus is described below.

First, in step S7001, an EKB file to be applied to the content to be played back from the removable storage device is selected. The selection of the EKB file is performed by acquiring, from the removable storage device, an EKB file whose version is identical to that indicated by the EKB version information added to the data file including the encrypted content, as described earlier with reference to FIG. 17. If it is determined in step S7002 that the EKB has been successfully acquired, the process proceeds to the next step. However, if the EKB cannot be acquired, it is determined that an error has occurred (step S7011) and the process is terminated.

In step S7003, a root key Kroot, which is one of keys included in the hierarchical tree structure, is acquired by decrypting the EKB acquired from the removable storage device, wherein the decryption is performed using a device node key (DNK) set including a leaf key and node keys stored in the data processing apparatus. If the root key Kroot has been successfully acquired, the process proceeds to the next step. However, if the root key Kroot cannot be acquired, it is determined that an error has occurred (step S7011) and the process is terminated. The failure in acquisition of the root key Kroot can occur, for example, when the data processing apparatus has been revoked.

In step S7005, an encrypted content Enc(Kst, DATA) is read from the data file stored in the removable storage device. Thereafter, an encrypted content key Enc(Kroot, Kcon) is read from the data file stored in the removable storage device and a content key Kcon is acquired by decrypting the encrypted content key Enc(Kroot, Kcon) using the root key Kroot acquired in step S7003 by decrypting the EKB (step S7006).

In step S7007, a storage key Kst is produced by encrypting the ID of the data processing apparatus using the content key according to Enc(Kcon, ID) In the next step S7008, the encrypted content Enc(Kst, DATA) read from the data file stored in the removable storage device is decrypted using the produced storage key Kst.

If it is determined in step S7009 that the decryption is successful, the content is played back in step S7010. However, if it is determined in step S7009 that the decryption is unsuccessful, it is determined that an error has occurred (step S7011) and the process is terminated. In a case in which the storage key produced in step S7007 on the basis of the ID is different from the storage key used in the process of storing the content into the removable storage device, it is determined that an error has occurred. In a case in which the storage key is produced on the basis of a different ID, the content cannot be played back.

Although not described in the above embodiments, in a case in which a removable storage device has a data processing capability, mutual authentication may be performed between the removable storage device and a data processing apparatus serving as a playback apparatus or a content distribution terminal before performing transferring of data between them, and the transferring of data between them may be performed only if the mutual authentication is successfully passed.

The present invention has been described in detail above with reference to particular embodiments. It will be apparent to those skilled in the art that various modifications and substitution to those embodiments may be made in the embodiment chosen for illustration without departing from the spirit and scope of the invention. That is, the embodiments have been described above by way of example and not limitation. The scope of the invention is to be determined solely by the appended claims.

Note that processes disclosed herein in the present description may be executed by hardware, software, or a combination of hardware and software. Execution of processes by software may be accomplished by installing a program, in which a sequence of processing steps is described, into a memory disposed in a computer embedded in dedicated hardware, or by installing such a program into a general-purpose computer capable of executing various kinds of processes.

The program may be stored, in advance, in a storage medium such as a hard disk or a ROM (Read Only Memory). Alternatively, the program may be stored (recorded) temporarily or permanently on a removable storage medium such as a floppy disk, a CD-ROM (Compact Disc Read Only Memory), an MO (Magnetooptical) disk, a DVD (Digital Versatile Disc), a magnetic disk, or a semiconductor memory. Such a removable recording medium may be provided in the form of so-called package software.

Instead of installing the program from such a storage medium onto the computer, the program may also be transferred to the computer from a download site by means of radio transmission or by means of cable transmission via a network such as an LAN (Local Area Network) or the Internet. In this case, if the computer receives the program transmitted in such a manner, the computer installs the program on a storage medium such as a hard disk disposed in the computer.

The processes disclosed in the present description may be executed time-sequentially in the same order as processing steps are described in the program, or may-be executed in parallel or individually depending on the capacity or capability of an apparatus which executes processes. In the present description, the term "system" is used to describe a logical collection of a plurality of devices, and it is not necessarily required that the plurality of devices are disposed in a single case.

INDUSTRIAL APPLICABILITY

According to the information recording apparatus, the information playback apparatus, the information recording method, or the information playback method, as described above, it is possible to allow only a specific limited device to play back a content stored in a removable storage device such as a memory card such that the content is allowed to be played back if and only if the device is capable of extracting a content key by decrypting an enabling key block (EKB) and furthermore the device is the same as that which has stored the content into the removable storage. Even in a case in which there are plural devices capable of decrypting the same EKB, the device allowed to play back a content from a removable storage device can be limited only to the that which has stored the content into the removable storage device.

Furthermore, according to the information recording apparatus, the information playback apparatus, the information recording method, or the information playback method, as described above, it is possible to allow only a specific limited device to play back a content which has been stored into a removable storage device from an external content distribution terminal such that the content is allowed to be played back if and only if the device is capable of extracting a content key by decrypting an EKB and the device is the same as that which was specified when the content was purchased. Even in a case in which there are plural devices capable of decrypting the same EKB, the device allowed to play back a content from a removable storage device can be limited only to the that which was specified when the content was purchased.

The invention claimed is:

1. An information recording apparatus for recording information onto a recording medium, said apparatus comprising:
   storage means for storing a device node key (DNK) set that includes one or more leaf keys and a plurality of node keys, the one or more leaf keys being associated with one or more leaves such that a unique one of the one or more leaf keys is associated with a particular one of the one or more leaves, the plurality of node keys being associated with a plurality of nodes such that a respective one of the plurality of node keys is associated with a specific one of the plurality of nodes, the plurality of nodes and the one or more leaves being arranged according to a hierarchical tree structure having a plurality of levels, the one or more leaves being further associated with one or more information recording apparatuses such that a given one of the one or more leaves is associated with an individual one of the one or more information recording apparatuses; and
   cryptographic means for encrypting content data to be stored in the recording medium, said cryptographic means including:
      means for producing a first encryption key (Kst) by encrypting, using a second encryption key (Kcon), a value uniquely assigned to a specific data playback apparatus that is to play back the content data,
      means for producing encrypted data Enc(Kst, DATA) by encrypting the content data using the first encryption key (Kst),
      means for producing encrypted key data by encrypting the second encryption key (Kcon) using a selected one of at least a portion of the plurality of node keys located along at least one path within the hierarchical tree structure, the at least portion of the plurality of node keys being stored in an enabling key block (EKB) and being encrypted such that each one of the at least portion of the plurality of node keys is encrypted using at least another one of the at least portion of the plurality of node keys that is located at a lower level along the at least one path than the one of the at least portion of the plurality of node keys or using one of the one or more leaf keys, and
      means for storing a data file including the encrypted data, the encrypted key data, and the enabling key block (EKB) into the recording medium.

2. An information recording apparatus according to claim 1, wherein said information recording apparatus is the specific data playback apparatus, and the uniquely assigned value is a value uniquely assigned to said information recording apparatus.

3. An information recording apparatus according to claim 1, wherein said information recording apparatus is a content distribution terminal for distributing a content, the specific data playback apparatus is a data playback apparatus which plays back content downloaded from the content distribution terminal, the uniquely assigned value is an externally supplied value uniquely assigned to the data playback apparatus, and said information recording apparatus performs the encryption process by applying the second encryption key (Kcon) to the externally supplied value.

4. An information recording apparatus according to claim 1, wherein the value uniquely assigned to the data playback apparatus is a unique telephone number of the data playback apparatus or is unique identification data associated with the data playback apparatus.

5. An information recording apparatus according to claim 1, wherein the recording medium is a removable recording medium which can be removably attached to said information recording apparatus.

6. An information recording apparatus according to claim 1, wherein the selected one of the at least portion of the plurality of node keys is a root key (Kroot) assigned to the root node of the hierarchical tree structure.

7. An information recording apparatus according to claim 1, wherein the selected one of the at least portion of the plurality of node keys is a key which can be acquired by decrypting the enabling key block (EKB) using the device node key (DNK) set.

8. An information recording apparatus according to claim 1, wherein the selected one of the at least portion of the plurality of node keys is renewable, and said information recording apparatus acquires a renewed selected one of the at least portion of the plurality of node keys by decrypting the enabling key block (EKB) using the device node key (DNK) set.

9. An information recording apparatus according to claim 1, wherein said cryptographic means produces the second encryption key (Kcon) based on a random number.

10. An information playback apparatus for playing back data stored in a storage medium, said apparatus comprising:
  storage means for storing a device node key (DNK) set that includes one or more leaf keys and a plurality of node keys, the one or more leaf keys being associated with one or more leaves such that a unique one of the one or more leaf keys is associated with a particular one of the one or more leaves, the plurality of node keys being associated with a plurality of nodes such that a respective one of the plurality of node keys is associated with a specific one of the plurality of nodes, the plurality of nodes and the one or more leaves being arranged according to a hierarchical tree structure having a plurality of levels, the one or more leaves being further associated with one or more information recording apparatuses such that a given one of the one or more leaves is associated with an individual one of the one or more information recording apparatuses; and
  cryptographic means for decrypting content data stored in the storage medium, including:
    means for acquiring, by decrypting an enabling key block (EKB) stored in the storage medium using the device node key (DNK) set, a selected one of at least a portion of the plurality of node keys located along at least one path within the hierarchical tree structure, the at least portion of the plurality of node keys being stored in the enabling key block (EKB) and being encrypted such that each one of the at least portion of the plurality of node keys is encrypted using at least another one of the at least portion of the plurality node keys that is located at a lower level along the at least one path than the one of the at least portion of the plurality of node keys or using one of the one or more leaf keys,
    means for acquiring a second decryption key (Kcon) by decrypting encrypted key data using the selected one of the at least a portion of the plurality of node keys,
    means for producing a first decryption key (Kst) by encrypting a value uniquely assigned to the information playback apparatus using the second decryption key (Kcon), and
    means for decrypting encrypted data Enc(Kst, DATA) stored in the storage medium using the first decryption key (Kst) to obtain the content data.

11. An information playback-apparatus according to claim 10, wherein the value uniquely assigned to the information playback apparatus is a unique telephone number of the information playback apparatus or is unique identification data associated with the information playback apparatus.

12. An information playback apparatus according to claim 10, wherein the storage medium is a removable storage medium which can be removably attached to the information playback apparatus.

13. An information playback apparatus according to claim 10, wherein the selected one of the at least portion of the plurality of node keys is a root key (Kroot) assigned to the root node of the hierarchical tree structure.

14. An information playback apparatus according to claim 10, wherein the selected one of the at least portion of the plurality of node keys is renewable, and the information playback apparatus acquires a renewed one of the at least portion of the plurality of node keys by decrypting the enabling key block (EKB) using the device node key (DNK) set.

15. In an information recording apparatus, a method of recording information into a recording medium, said method comprising:
  storing a device node key (DNK) set that includes one or more leaf keys and a plurality of node keys, the one or more leaf keys being associated with one or more leaves such that a unique one of the one or more leaf keys is associated with a particular one of the one or more leaves, the plurality of node keys being associated with a plurality of nodes such that a respective one of the plurality of node keys is associated with a specific one of the plurality of nodes, the plurality of nodes and the one or more leaves being arranged according to a hierarchical tree structure having a plurality of levels, the one or more leaves being further associated with one or more information recording apparatuses such that a given one of the one or more leaves is associated with an individual one of the one or more information recording apparatuses;
  producing a first encryption key (Kst) by encrypting, using a second encryption key (Kcon), a value uniquely assigned to a specific data playback apparatus that is to play back the content data;
  producing encrypted data Enc(Kst, DATA) by encrypting the content data using the first encryption key (Kst);
  producing encrypted key data by encrypting the second encryption key (Kcon) using a selected one of at least a portion of the plurality of node keys located along at least one path within the hierarchical tree structure, the at least portion of the plurality of node keys being stored in an enabling key block (EKB) and being encrypted such that each one of the at least portion of the plurality of node keys is encrypted using at least another one of the at least portion of the plurality of node keys that is located at a lower level along the at least one path than the one of the at least portion of the plurality of node keys or using one of the one or more leaf keys;
  storing a data file including the encrypted data, the encrypted key data, and the enabling key block (EKB) into the recording medium.

16. A method according to claim 15, wherein said information recording apparatus is the specific data playback apparatus, and the uniquely assigned value is a value uniquely assigned to said information recording apparatus.

17. A method according to claim 15, wherein said information recording apparatus is a content distribution terminal for distributing content, the specific data playback apparatus is a data playback apparatus which plays back content downloaded from the content distribution terminal, the uniquely assigned value is an externally supplied value uniquely assigned to the data playback apparatus, and said step of producing the first encryption key (Kst) includes encrypting the externally supplied value using the second encryption key (Kcon).

18. A method according to claim 15, wherein the value uniquely assigned to the data playback apparatus is a unique telephone number of the data playback apparatus or is unique identification data associated with the data playback apparatus.

19. A method according to claim 15, wherein the recording medium is a removable recording medium which can be removably attached to the information recording apparatus.

20. A method according to claim 15, wherein the selected one of the at least portion of the plurality of node keys is a root key (Kroot) assigned to the root node of the hierarchical tree structure.

21. A method according to claim 15, wherein the selected one of the at least portion of the plurality of node keys is a key which can be acquired by decrypting the enabling key block (EKB) using the device node key (DNK) set.

22. A method according to claim 15, wherein the selected one of the at least portion of the plurality of node keys is renewable, and said method further comprises: acquiring a renewed selected one of the at least portion of the plurality of node keys by decrypting the enabling key block (EKB) using the device node key (DNK) set.

23. A method according to claim 15, further comprising: producing the second encryption key (Kcon) based on a random number.

24. In an information playback apparatus, a method of playing back data stored in a storage medium, said method comprising:
   storing a device node key (DNK) set that includes one or more leaf keys and a plurality of node keys, the one or more leaf keys being associated with one or more leaves such that a unique one of the one or more leaf keys is associated with a particular one of the one or more leaves, the plurality of node keys being associated with a plurality of nodes such that a respective one of the plurality of node keys is associated with a specific one of the plurality of nodes, the plurality of nodes and the one or more leaves being arranged according to a hierarchical tree structure having a plurality of levels, the one or more leaves being further associated with one or more information recording apparatuses such that a given one of the one or more leaves is associated with an individual one of the one or more the information playback apparatus is a unique telephone number of the information playback apparatus or is unique identification data associated with the information playback apparatus.

25. A method according to claim 24, wherein the value uniquely assigned to medium, said method comprising:
   storing a device node key (DNK) set that includes one or more leaf keys and a plurality of node keys, the one or more leaf keys being associated with one or more leaves such that a unique one of the one or more leaf keys is associated with a particular one of the one or more leaves, the plurality of node keys being associated with a plurality of nodes such that a respective one of the plurality of node keys is associated with a specific one of the plurality of nodes, the plurality of nodes and the one or more leaves being arranged according to a hierarchical tree structure having a plurality of levels, the one or more leaves being further associated with one or more information recording apparatuses such that a given one of the one or more leaves is associated with an individual one of the one or more information recording apparatuses;
   producing a first encryption key (Kst) by encrypting, using a second encryption key (Kcon), a value uniquely assigned to a specific data playback apparatus that is to play back the content data;
   producing encrypted data Enc(Kst, DATA) by encrypting the content data using the encryption key (Kst);
   producing encrypted key data by encrypting the second encryption key (Kcon) using a selected one of at least a portion of the plurality of node keys located along at least one path within the hierarchical tree structure, the at least portion of the plurality of node keys being stored in an enabling key block (EKB) and being encrypted such that each one of the at least portion of the plurality of node keys is encrypted using at least another one of the at least portion of the plurality of node keys that is located at a lower level along the at least one path than the one of the at least portion of the plurality of node keys or using one of the one or more leaf keys;
   storing a data file including the encrypted data, the encrypted key data, and the enabling key block (EKB) into the recording medium.

26. A method according to claim 24, wherein the storage medium is a removable storage medium which can be removably attached to the information playback apparatus.

27. A method according to claim 24, wherein the selected one of the at least portion of the plurality of node keys is a root key (Kroot) assigned to the root node of the hierarchical tree structure.

28. A method according to claim 24, wherein the selected one of the at least portion of the plurality of node keys is renewable, and said method further comprises: acquiring a renewed one of the at least portion of the plurality of node keys by decrypting the enabling key block (EKB) using the device node key (DNK) set.

29. A processor having a program for carrying out, in an information recording apparatus, a method of recording information into a recording information recording apparatuses;
   acquiring, by decrypting an enabling key block (EKB) stored in the storage medium using the device node key (DNK) set, a selected one of at least a portion of the plurality of node keys located along at least one path within the hierarchical tree structure, the at least portion of the plurality of node keys being stored in the enabling key block (EKB) and being encrypted such that each one of the at least portion of the plurality of node keys is encrypted using at least another one of the at least portion of the plurality node keys that is located at a lower level along the at least one path than the one of the at least portion of the plurality of node keys or using one of the one or more leaf keys;
   acquiring a second decryption key (Kcon) by decrypting encrypted key data using the selected one of the at least a portion of the plurality of node keys;
   producing a first decryption key (Kst) by encrypting a value uniquely assigned to the information playback apparatus using the second decryption key (Kcon); and
   decrypting encrypted data Enc(Kst, DATA) stored in the storage medium using the first decryption key (Kst) to obtain the content data.

30. A processor having a program for carrying out, in an information playback apparatus, a method of playing back data stored in a storage medium, said method comprising:
   storing a device node key (DNK) set that includes one or more leaf keys and a plurality of node keys, the one or more leaf keys being associated with one or more leaves such that a unique one of the one or more leaf keys is associated with a particular one of the one or more leaves, the plurality of node keys being associated with a plurality of nodes such that a respective one of the plurality of node keys is associated with a specific one of the plurality of nodes, the plurality of nodes and the one or more leaves being arranged according to a hierarchical tree structure having a plurality of levels, the one or more leaves being further associated with one or more information recording apparatuses such that a given one of the one or more leaves is associated with an individual one of the one or more information recording apparatuses;

acquiring, by decrypting an enabling key block (EKB) stored in the storage medium using the device node key (DNK) set, a selected one of at least a portion of the plurality of node keys located along at least one path within the hierarchical tree structure, the at least portion of the plurality of node keys being stored in the enabling key block (EKB) and being encrypted such that each one of the at least portion of the plurality of node keys is encrypted using at least another one of the at least portion of the plurality node keys that is located at a lower level along the at least one path than the one of the at least portion of the plurality of node keys or using one of the one or more leaf keys;

acquiring second decryption key (Kcon) by decrypting encrypted key data using the selected one of the at least a portion of the plurality of node keys;

producing a first decryption key (Kst) by encrypting a value uniquely assigned to the information playback apparatus using the second decryption key (Kcon); and decrypting encrypted data Enc(Kst, DATA) stored in the storage medium using the first decryption key (Kst) to obtain the content data.

* * * * *

UNITED STATES PATENT AND TRADEMARK OFFICE
CERTIFICATE OF CORRECTION

PATENT NO. : 7,362,870 B2
APPLICATION NO. : 10/311488
DATED : April 22, 2008
INVENTOR(S) : Takumi Okaue It is certified that error appears in the above-identified patent and that said Letters Patent is hereby corrected as shown below:

Column 26, line 59, "at" should read --are--.

Column 31, line 12, "may-be" should read --maybe--.

Column 38, line 3, after "acquiring", insert --a--.

Column 35, lines 18-35, claim 24, should read

--In an information playback apparatus, a method of playing back data stored in a storage medium, said method comprising:

storing a device node key (DNK) set that includes one or more leaf keys and a plurality of node keys, the one or more leaf keys being associated with one or more leaves such that a unique one of the one or more leaf keys is associated with a particular one of the one or more leaves, the plurality of node keys being associated with a plurality of nodes such that a respective one of the plurality of node keys is associated with a specific one of the plurality of nodes, the plurality of nodes and the one or more leaves being arranged according to a hierarchical tree structure having a plurality of levels, the one or more leaves being further associated with one or more information recording apparatuses such that a given one of the one or more leaves is associated with an individual one of the one or more information recording apparatuses;

acquiring, by decrypting an enabling key block (EKB) stored in the storage medium using the device node key (DNK) set, a selected one of at least a portion of the plurality of node keys located along at least one path within the hierarchical tree structure, the at least portion of the plurality of node keys being stored in the enabling key block (EKB) and being encrypted such that each one of the at least portion of the plurality of node keys is encrypted using at least another one of the at least portion of the plurality node keys that is located at a lower level along the at least one path than the one of the at least portion of the plurality of node keys or using one of the one or more leaf keys;

acquiring a second decryption key (Kcon) by decrypting encrypted key data using the selected one of the at least a portion of the plurality of node keys;

UNITED STATES PATENT AND TRADEMARK OFFICE
CERTIFICATE OF CORRECTION

| | |
|---|---|
| PATENT NO. | : 7,362,870 B2 |
| APPLICATION NO. | : 10/311488 |
| DATED | : April 22, 2008 |
| INVENTOR(S) | : Takumi Okaue |

It is certified that error appears in the above-identified patent and that said Letters Patent is hereby corrected as shown below:

producing a first decryption key (Kst) by encrypting a value uniquely assigned to the information playback apparatus using the second decryption key (Kcon); and
      decrypting encrypted data Enc(Kst, DATA) stored in the storage medium using the first decryption key (Kst) to obtain the content data.--

Column 35, line 40 to Column 36, lines 1-12, claim 25, should read

--A method according to claim 24, wherein the value uniquely assigned to the information playback apparatus is a unique telephone number of the information playback apparatus or is unique identification data associated with the information playback apparatus.--

Column 36, lines 26-51, claim 29, should read

--A processor having a program for carrying out, in an information recording apparatus, a method of recording information into a recording medium, said method comprising:
      storing a device node key (DNK) set that includes one or more leaf keys and a plurality of node keys, the one or more leaf keys being associated with one or more leaves such that a unique one of the one or more leaf keys is associated with a particular one of the one or more leaves, the plurality of node keys being associated with a plurality of nodes such that a respective one of the plurality of node keys is associated with a specific one of the plurality of nodes, the plurality of nodes and the one or more leaves being arranged according to a hierarchical tree structure having a plurality of levels, the one or more leaves being further associated with one or more information recording apparatuses such that a given one of the one or more leaves is associated with an individual one of the one or more information recording apparatuses;
      producing a first encryption key (Kst) by encrypting, using a second encryption key (Kcon), a value uniquely assigned to a specific data playback apparatus that is to play back the content data;
      producing encrypted data Enc(Kst, DATA) by encrypting the content data using the encryption key (Kst);

UNITED STATES PATENT AND TRADEMARK OFFICE
CERTIFICATE OF CORRECTION

PATENT NO. : 7,362,870 B2
APPLICATION NO. : 10/311488
DATED : April 22, 2008
INVENTOR(S) : Takumi Okaue It is certified that error appears in the above-identified patent and that said Letters Patent is hereby corrected as shown below:

producing encrypted key data by encrypting the second encryption key (Kcon) using a selected one of at least a portion of the plurality of node keys located along at least one path within the hierarchical tree structure, the at least portion of the plurality of node keys being stored in an enabling key block (EKB) and being encrypted such that each one of the at least portion of the plurality of node keys is encrypted using at least another one of the at least portion of the plurality of node keys that is located at a lower level along the at least one path than the one of the at least portion of the plurality of node keys or using one of the one or more leaf keys;
storing a data file including the encrypted data, the encrypted key data, and the enabling key block (EKB) into the recording medium.--

Signed and Sealed this

Fourth Day of August, 2009

JOHN DOLL
*Acting Director of the United States Patent and Trademark Office*